US012780085B2

(12) United States Patent
Bertani et al.

(10) Patent No.: US 12,780,085 B2
(45) Date of Patent: Nov. 3, 2026

(54) METHOD, SYSTEM, AND COMPUTER-READABLE MEDIUM FOR A MODULAR SMART LIGHT

(71) Applicant: Unit 1 Gear, Inc., North Palm Beach, FL (US)

(72) Inventors: Javier Mariano Bertani, North Palm Beach, FL (US); Juan Garcia Mansilla, North Palm Beach, FL (US); Marcos Madia, North Palm Beach, FL (US); Francisco Abelleira Blanco, North Palm Beach, FL (US)

(73) Assignee: UNIT 1 GEAR, INC., North Palm Beach, FL (US)

( * ) Notice: Subject to any disclaimer, the term of this patent is extended or adjusted under 35 U.S.C. 154(b) by 0 days.

(21) Appl. No.: 18/869,838

(22) PCT Filed: May 30, 2023

(86) PCT No.: PCT/US2023/067620
§ 371 (c)(1),
(2) Date: Nov. 26, 2024

(87) PCT Pub. No.: WO2023/230633
PCT Pub. Date: Nov. 30, 2023

(65) Prior Publication Data

US 2025/0236236 A1 Jul. 24, 2025

Related U.S. Application Data

(60) Provisional application No. 63/346,320, filed on May 27, 2022.

(51) Int. Cl.
*B60Q 1/34* (2006.01)
*B60Q 1/26* (2006.01)
(Continued)

(52) U.S. Cl.
CPC ........... *B60Q 1/343* (2013.01); *B60Q 1/2615* (2013.01); *B60Q 1/2676* (2013.01); *B60Q 1/28* (2013.01);
(Continued)

(58) Field of Classification Search
CPC .... B60Q 1/343; B60Q 1/2615; B60Q 1/2676; B60Q 1/28; B60Q 1/0076; B60Q 1/30;
(Continued)

(56) References Cited

U.S. PATENT DOCUMENTS 10,100,989 B1 * 10/2018 Hamasaki ................ B62J 6/029
2013/0285802 A1 * 10/2013 Juang .................. B60Q 1/2673
340/432

(Continued)

FOREIGN PATENT DOCUMENTS

WO 2021245251 12/2021
WO 2021245257 12/2021
WO 2023288144 1/2023

OTHER PUBLICATIONS

"Lumos Firefly: The Ultimate Bike Light System," BackerCrew, retrieved from the internet: <https://backercrew.com/lumosfirefly-the-ultimate-bike-light-system/>, Aug. 29, 2022.

(Continued)

*Primary Examiner* — Anh V La
(74) *Attorney, Agent, or Firm* — Hodgson Russ LLP

(57) ABSTRACT

A method, system, and computer-readable medium for a modular smart light is provided. A modular smart light method can provide safety illumination during a user's operation of a vehicle. The method can include attaching a modular smart light to a front mount. A sensor of the modular smart light can determine whether the modular smart light is oriented in a front orientation or a rear orientation. The modular smart light can operate in a front
(Continued)

orientation mode based upon the determination of the sensor that the modular smart light is in the front orientation. The modular smart light can switch from operating in the front orientation mode to operating in a rear orientation mode based upon a determination of the sensor.

20 Claims, 23 Drawing Sheets

(51) Int. Cl.

| | |
|---|---|
| ***B60Q 1/28*** | (2006.01) |
| ***B62J 6/03*** | (2020.01) |
| ***B62J 6/04*** | (2020.01) |
| ***B62J 45/41*** | (2020.01) |

(52) U.S. Cl.
CPC . *B62J 6/03* (2020.02); *B62J 6/04* (2013.01); *B62J 45/41* (2020.02)

(58) Field of Classification Search
CPC . B60Q 1/34; B60Q 1/44; B60Q 1/2673; B62J 6/03; B62J 6/04; B62J 45/41; B62J 6/029; B62J 6/056
USPC ... 340/432, 815.4, 463, 815.49, 815.45, 475
See application file for complete search history.

(56) References Cited

U.S. PATENT DOCUMENTS

| | | | | |
|---|---|---|---|---|
| 2014/0326525 | A1 | 11/2014 | Doerksen | |
| 2015/0102919 | A1* | 4/2015 | Hsu | B62J 7/02 340/432 |
| 2016/0144917 | A1 | 5/2016 | Clyde | |
| 2016/0200383 | A1* | 7/2016 | McAleese | B62J 6/03 315/79 |
| 2019/0144062 | A1* | 5/2019 | Poole | B62J 45/412 340/432 |
| 2020/0010136 | A1* | 1/2020 | Yun | H05B 47/115 |

OTHER PUBLICATIONS

WIPO, International Search Report and Written Opinion for PCT/US2023/067620, Oct. 11, 2023.

* cited by examiner

METHOD, SYSTEM, AND COMPUTER-READABLE MEDIUM FOR A MODULAR SMART LIGHT

CROSS-REFERENCE TO RELATED APPLICATIONS

This application claims priority to the U.S. Provisional Patent Application No. 63/346,320, filed May 27, 2022, the entire disclosure of which is incorporated herein by reference.

FIELD OF THE DISCLOSURE

The present disclosure relates generally to the field of lighting, and more specifically to modular smart systems and methods for vehicles.

BACKGROUND OF THE DISCLOSURE

Vehicles such as bicycles, electric scooters, hover boards, and skateboards are becoming increasingly popular as a means of transportation. However, these vehicles can be difficult to see at night, which can increase the risk of accidents. Safety lights are a common way to increase visibility at night. However, traditional safety lights have a number of limitations. For example, they are limited to being fixed in a single position. Traditional lights are also limited in their function, for example, serving as only one of a front-facing light, rear-facing light, or a turn signal. Such lights are also limited in their mounting placement, as they may be mountable only to a specific portion of a bicycle (e.g. a front handle bar, seat post, etc.) or are integrally formed as part of a vehicle accessory (e.g. a helmet).

BRIEF SUMMARY OF THE DISCLOSURE

Embodiments of the present disclosure include a method, system, and computer-readable medium for a modular smart light that can overcome the aforementioned limitations of traditional vehicle lights. The modular smart light can be removably attachable to a plurality of different mounts. Moreover, the modular smart light can include a sensor that detects the orientation of the smart light. Based upon the detected orientation, the smart light can determine which side of the smart light is left and right. The modular smart light can then use this information to display an appropriate light operation, such as a headlight operation, a taillight operation, a left turn signal operation, and a right turn signal operation. The modular smart light can automatically adjust the light operation to account for its mounted orientation (e.g. front, rear, side, angled, etc.) and/or location (e.g. on a vehicle, user, or vehicle accessory, such as a helmet). This adjustment can include adjusting the sides that left and right turn signals are displayed on the smart light to account for a switch between a front mount and a rear mount.

A modular smart light method can provide safety illumination during a user's operation of a vehicle. The method can include attaching a modular smart light to a front mount. The modular smart light can be programmed to display a plurality of light operations, including a headlight operation, a taillight operation, a left turn signal operation, and a right turn signal operation. A sensor of the modular smart light can determine whether the modular smart light is oriented in a front orientation or a rear orientation. The modular smart light can operate in a front orientation mode based upon the determination of the sensor that the modular smart light is in the front orientation. The modular smart light can switch from operating in the front orientation mode to operating in a rear orientation mode based upon the determination of the sensor that the modular smart light has moved from the front orientation to a rear orientation. The modular smart light can attach to a rear mount. The headlight operation can be displayed in the front orientation mode, and the taillight operation can be displayed in the rear orientation mode.

Switching the modular smart light from operating in the front orientation mode to operating the modular smart light in a rear orientation mode can include automatically switching a display side of the left turn signal operation and right turn signal operation based upon the determination of the sensor that the modular smart light has changed from the front orientation mode to the rear orientation mode.

The sensor can be a position sensor configured to measure angular position of the modular smart light. For example, the sensor can include one or more of the following: a gyroscope and an accelerometer. The sensor can additionally, or alternatively, detect a position of the modular smart light relative to the mount. Detecting a position of the modular smart light relative to the mount can include detecting a wireless signal from the mount, detecting a magnetic field from the mount; and/or detecting a physical shape of the mount.

According to embodiments of the present disclosure, the front mount can be located on one of the following: a front of the vehicle, a front of a helmet, and a front of a backpack. The rear mount can be located on one of the following: a rear of the vehicle, a rear of the helmet, and a rear of the backpack.

The modular smart light can be removably detachable to the front mount and to the rear mount via a magnetic attachment system. The modular smart light can be at least partially received within the front mount and/or the rear mount in a plurality of different relative orientations, including a positive relative orientation and a negative relative orientation. The magnetic attachment system can comprise a plurality of magnets in a pattern of different polar orientations on the front mount and/or the rear mount. The pattern of different polar orientations can be complimentary to a pattern of polar orientations of a plurality magnets on the modular smart light, such that the modular smart light is attracted to the front mount or the rear mount in the positive relative orientation, and the modular smart light is repelled from the front mount or the rear mount in the negative relative orientation.

A mount according to embodiments of the present disclosure can include a cradle. The modular smart light can be at least partially received within the cradle of the mount according to a plurality of different relative orientations, including a positive relative orientation and a negative relative orientation. The cradle and modular smart light can be asymmetrically-shaped such that the modular smart light is physically blocked from being fully received by the cradle in the negative relative orientation, but fully received by the cradle in the positive relative orientation.

A modular smart light system can provide safety illumination during a user's operation of a vehicle. The system can comprise a modular smart light attached to a front mount. The modular smart light can be configured to display a plurality of light operations, including a headlight operation, a taillight operation, a left turn signal operation, and a right turn signal operation. A sensor can be configured to determine whether the modular smart light is oriented in a front orientation or a rear orientation. A processor can be configured to operate the modular smart light in a front orientation mode based upon the determination of the sensor that the modular smart light is in the front orientation. The processor can be configured to switch the modular smart light from operating in the front orientation mode to operating the modular smart light in a rear orientation mode based upon the determination of the sensor that the modular smart light has moved from the front orientation to a rear orientation. The headlight operation can be configured to be displayed in the front orientation mode, and the taillight operation is configured to be displayed in the rear orientation mode.

A non-transitory computer-readable storage medium can have program instructions stored thereon, that when executed by at least one processor, can cause the at least one processor to perform steps. The steps can comprise programming a modular smart light to display a plurality of light operations, including a headlight operation, a taillight operation, a left turn signal operation, and a right turn signal operation. A sensor of the modular smart light can determine whether the modular smart light is oriented in a front orientation or a rear orientation. The modular smart light can operate in a front orientation mode based upon the determination of the sensor that the modular smart light is in the front orientation. The modular smart light can switch from operating in the front orientation mode to operating the modular smart light in a rear orientation mode based upon the determination of the sensor that the modular smart light has moved from the front orientation to a rear orientation. The headlight operation can be displayed in the front orientation mode, and the taillight operation can be displayed in the rear orientation mode.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 1:
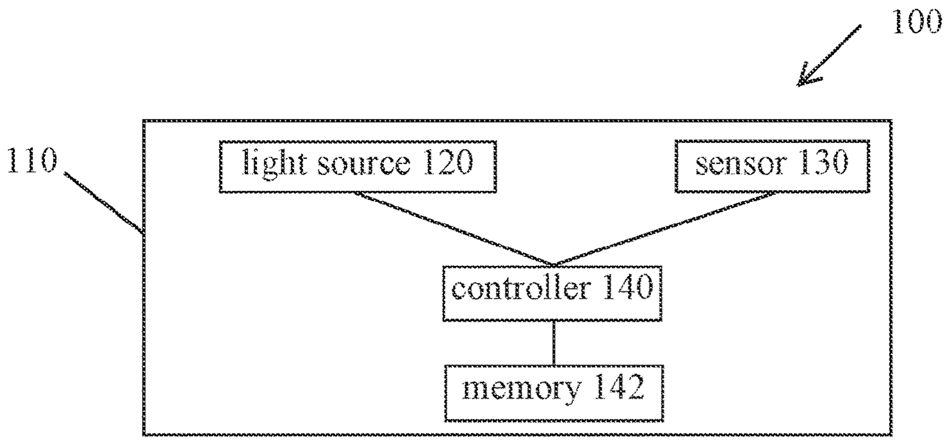
FIG. 1 is a schematic representation of a smart light.

FIG. 1 is a schematic representation of a smart light 100 according to embodiments of the present disclosure. The smart light 100 may comprise a housing 110, a light source 120, a sensor 130, a controller 140, and a memory 142. The light source 120, the sensor 130, the controller 140, and the memory may be disposed within the housing 110.

The light source 120 may be located within the housing 110 and may be configured to emit light. The light source 120 may be a single light source or a plurality of light sources that are configured to emit light. The light source 120 may be an LED or other type of light source. The light source 120 may output light of 500 lumens or more. Accordingly, the light source 120 may produce light having a brightness that is visible in a many conditions (e.g., daytime, nighttime, rain, snow, fog, etc.). The light source 120 may be configured to produce one or more colors of light. For example, the light source 120 may be configured to produce light that is white, red, amber, or other colors. Accordingly, the light source 120 may be usable as a front-facing headlight, a rear-facing brake light, identification light, and/or turn signal light. The light source 120 may be positioned within the housing 110 to emit light through a front surface 111 of the housing. The front surface 111 of the housing may be at least partially transparent or translucent, and may thereby transmit the light emitted by the light source 120.

The sensor 130 may be a position sensor located within the housing 110. According to certain embodiments, the sensor 130 can be configured to detect the orientation of the light source 120 and/or housing 110 based on position information of the sensor 130, such as an angular position or relative position. The sensor 130 may be a gyroscope, accelerometer, or other device capable of measuring position information. In some embodiments, the light source 120 may be used by a user in a particular (e.g. fixed) orientation, such as a horizontal orientation, vertical orientation, and/or an oblique orientation. Accordingly, the sensor 130 may be configured to determine the particular orientation of the light source 120 based on the detected position information from the sensor.

The controller 140 may be located within the housing 110 and may be in electronic communication with the light source 120 and the sensor 130. The controller 140 may be configured to control the light source 120 to emit light. For example, the controller 140 may be configured to control the on/off state, brightness, color, and or illumination pattern of the light source 120. In some embodiments, the smart light 100 can be controlled to display a plurality of predefined light operations, including a headlight operation, a taillight operation, a left turn signal operation, and a right turn signal operation. As an example, during a headlight operation, the light source 120 may be used on a vehicle, user, or vehicle accessory (e.g. helmet) as a front-facing headlight, and the controller 140 may be configured to control the light source 120 to emit white light. Moreover, during a taillight operation, the light source 120 may be used on a vehicle, user, or vehicle accessory (e.g. helmet) as a rear-facing taillight, and the controller 140 may be configured to control the light source 120 to emit red light. During a taillight operation, the light source 120 can also function as a brake light to indicate that the user or vehicle is slowing, for example, by controlling the light source to flash or brighten during a braking operation. In further embodiments, the light source 120 may be used to emit an alert pattern, and the controller 140 may be configured to control the light source 120 to flash a light (e.g. either a single color, such as red or white, or various colors). In yet further embodiments, the light source 120 may be a turn signal light, and the controller 140 may be configured to control the light source 120 to emit light on an appropriate side of the light source 120 to indicate a left or right turn. It should be understood that while each of these functions are described separately, the smart light 100 of the present disclosure may be configured to perform some or all of these functions separately or simultaneously.

The controller 140 may be configured to receive signals from the sensor 130 in order to control the light source 120. For example, the controller 140 may be configured to determine the orientation of the light source 120 based on the angular position information detected by the sensor 130. Based on the angular position information, the controller 140 may determine whether the light source 120 is front-facing or rear-facing, and/or whether the light source 120 is arranged horizontally or vertically. Depending on the determined orientation, which may be a predefined angular orientation or another type of position, the light source 120 can operate in a different light emitting mode, each mode having a predefined light operation. As an example, the smart light 100 can operate in a front orientation mode based upon the determination of the sensor that the smart light 100 is in the front orientation. The smart light 100 can switch from operating in the front orientation mode to operating in a rear orientation mode based upon the determination of the sensor that the modular smart light has moved from the front orientation to a rear orientation. A headlight operation can be displayed in the front orientation mode, and a taillight operation can be displayed in the rear orientation mode.

Figure 2A:
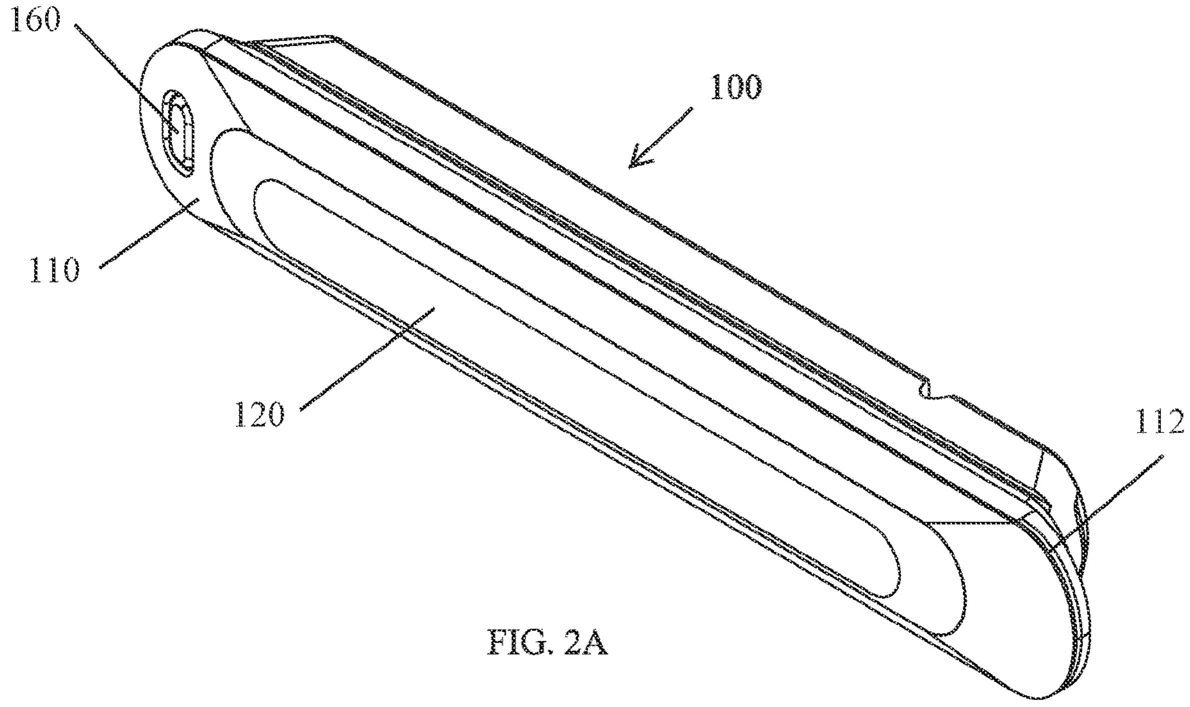
FIG. 2A is a front perspective view of an exemplary smart light.
Figure 2B:
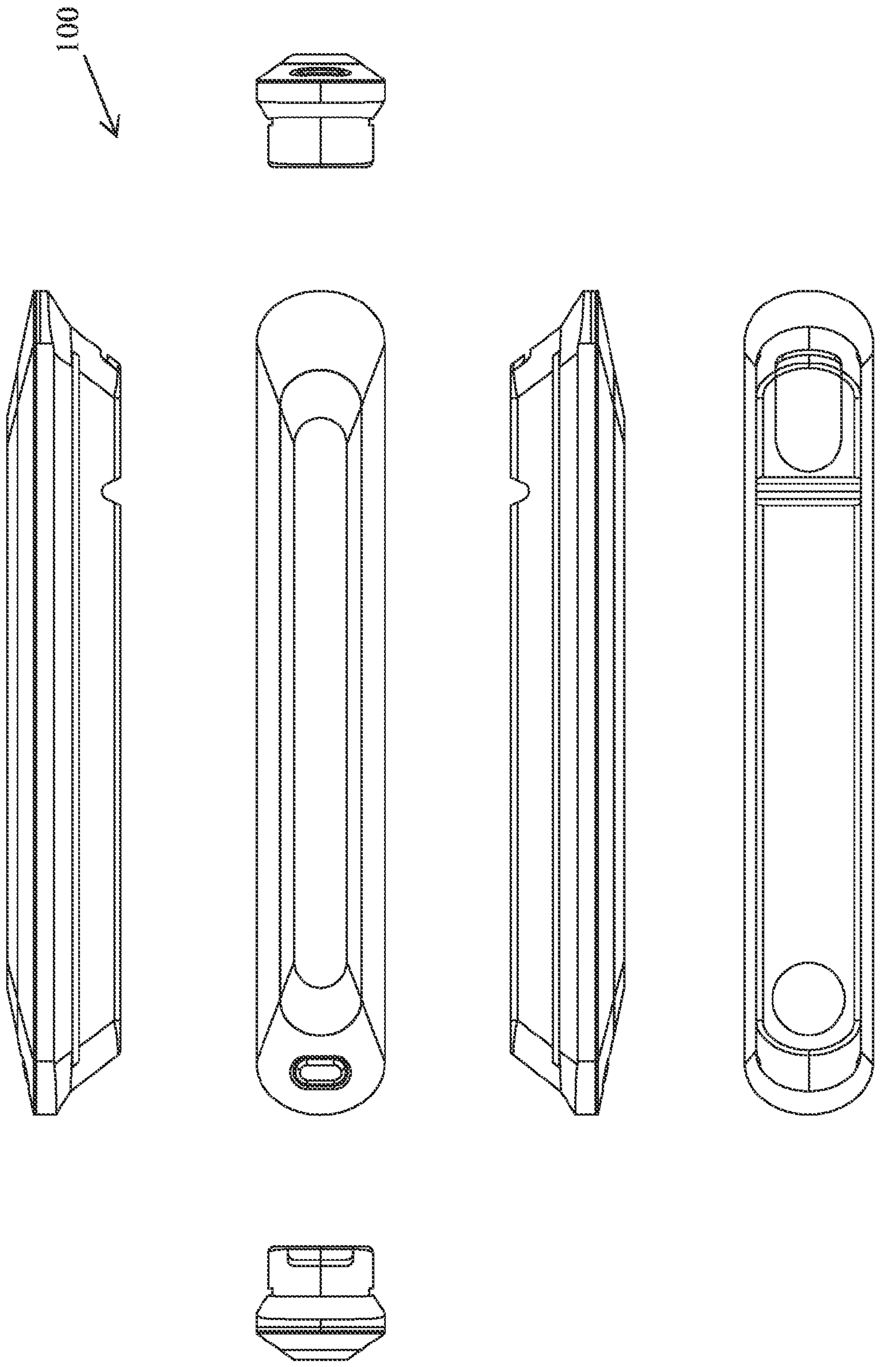
FIG. 2B are plan and elevation views of the exemplary smart light of FIG. 2A.

FIGS. 2A-2B illustrate an exemplary smart light 100 according to an embodiment of the present disclosure. The smart light 100 can include a housing 110, a light source 120, and a function button 160. The function button 160, for example, may be located on a front face of the housing 110, adjacent to the light source 120. The function button 160 can be used to input controls to the smart light 100, such as a power-on and power-off instruction. A front perimeter 112 of the housing 110 may be generally symmetrical, for example, having a track-shape.

FIGS. 3A-3D illustrate an exemplary smart light 100 determining a predefined light-emitting mode based upon a determined position of the smart light 100. According to embodiments of the present disclosure, there can be various orientations of the smart light 100. FIGS. 3A-3D provide four orientation examples: a rear-facing vertical orientation, a rear-facing horizontal orientation, a front-facing vertical orientation, and a front-facing horizontal orientation. However, the present disclosure is not limited to having four orientations as the smart light 100 can be configured to operate according to any number of predefined orientations depending on a particular application.

In some embodiments, a rear-facing horizontal light can operate (e.g. illuminate or display) in the same manner as a rear-facing vertical light. However, in other embodiments, a rear-facing horizontal light can operate (e.g. illuminate or display) in a different manner as a rear-facing vertical light. As an example, the smart light 100 can be configured to display left and right turn signals might in the front-facing horizontal or rear-facing horizontal arrangements, but not in the front-facing horizontal or rear-facing vertical arrangements. This difference in predefined light operation may be chosen due to any number of factors, including but not limited to the dimensions of the smart light 100, or other physical, visual, or spatial factors of the smart light 100. For example, the exemplary smart light 100 depicted in FIG. 2 has a length that is considerably longer than its width. Consequently, it may not be suitable to display left and right turn signals if the smart light is arranged vertically due to the relatively small width of the smart light 100 (e.g., the left and right sides may not be discernable from a distance). Therefore, in the illustrated embodiment, the smart light 100 operates in a different light emitting mode depending on whether the smart light 100 is oriented vertically or horizontally. It should be realized that other factors can also be used to determine a predefined light operation, including the location of the smart light 100 on a vehicle, user, or vehicle accessory. It is also contemplated that the predefined light operation can be manually adjusted by a user and/or change depending on outside factors such as a traveling speed of the smart light 100, a particular use or operation of the vehicle (e.g. braking or starting), weather conditions, or other criteria.

Figure 3A:
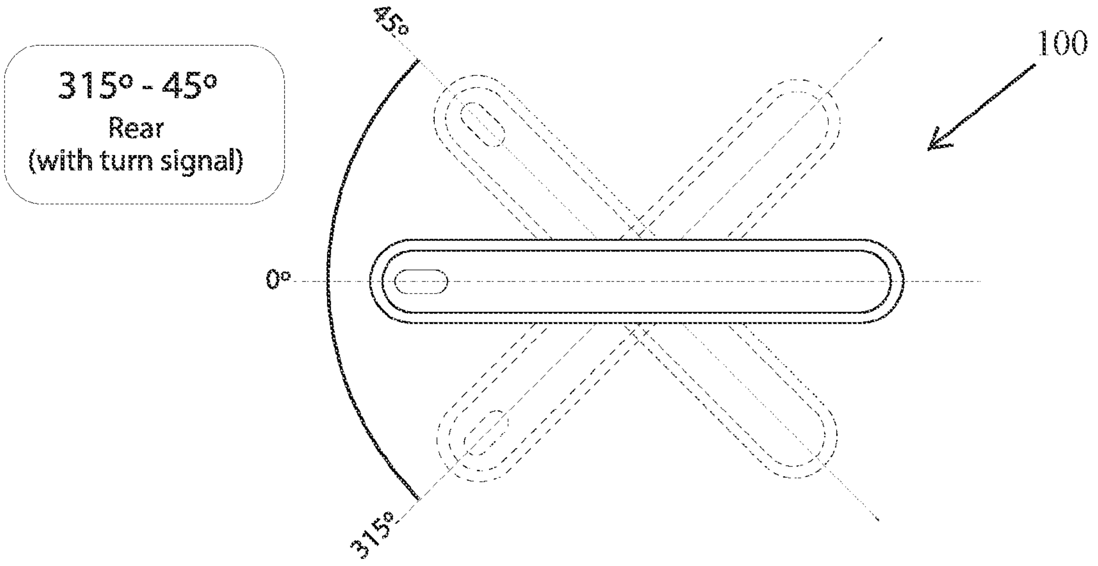
FIGS. 3A-3D illustrate an exemplary smart light determining a light emitting mode based upon a determined position.
Figure 3B:
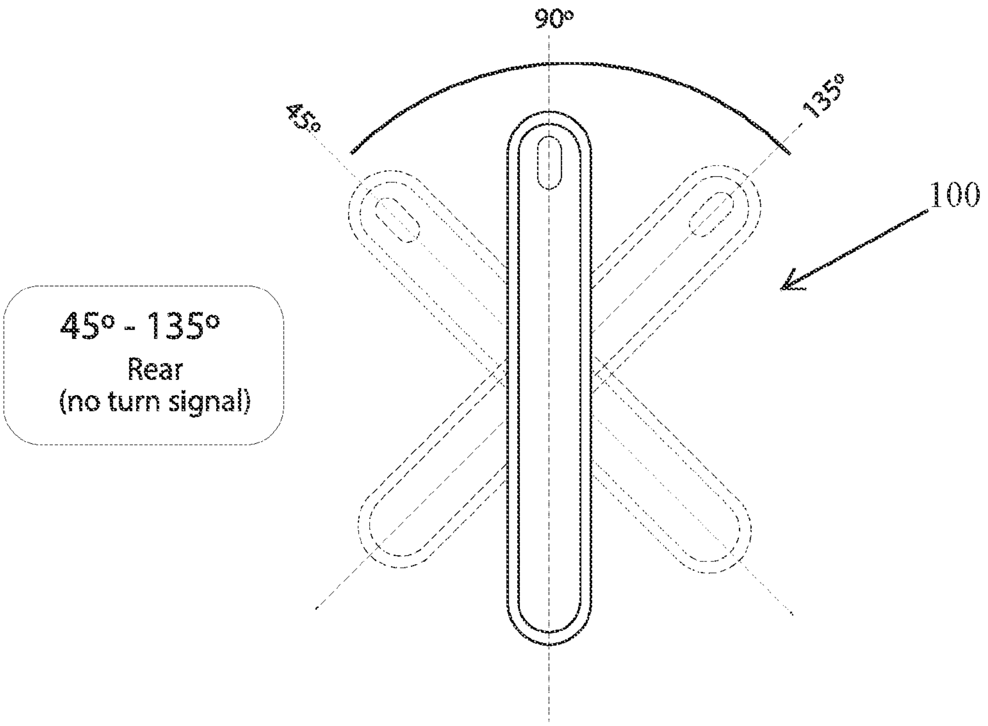

In FIGS. 3A and 3B, a sensor 130 of the smart light 100 determines that the smart light 100 is in a rear orientation mode. For example, the determination can be based on angular position of the smart light 100 measured along its longitudinal axis by the sensor 130. The following illustrated examples depict the smart light 100 at various angular positions, where the angle is measured from an initial position (0°) in which the smart light 100 is arranged horizontally, with the power button at the 9 o'clock position (i.e., the initial position of FIG. 3A).

In FIG. 3A, the smart light 100 and/or light source 120 are horizontally arranged at a 0°±45° angle, and can function as a rear-facing horizontal light (e.g. a taillight operation can be displayed by the smart light 100). In FIG. 3B, the smart light 100 and/or light source 120 are vertically-arranged arranged at a 90°±45° angle, and can function as a rear-facing vertical light (e.g. a taillight operation can be displayed by the smart light 100). As previously mentioned, the smart light 100 can display turn signals in the horizontal position, and not display turn signals in the vertical position.

Figure 3C:
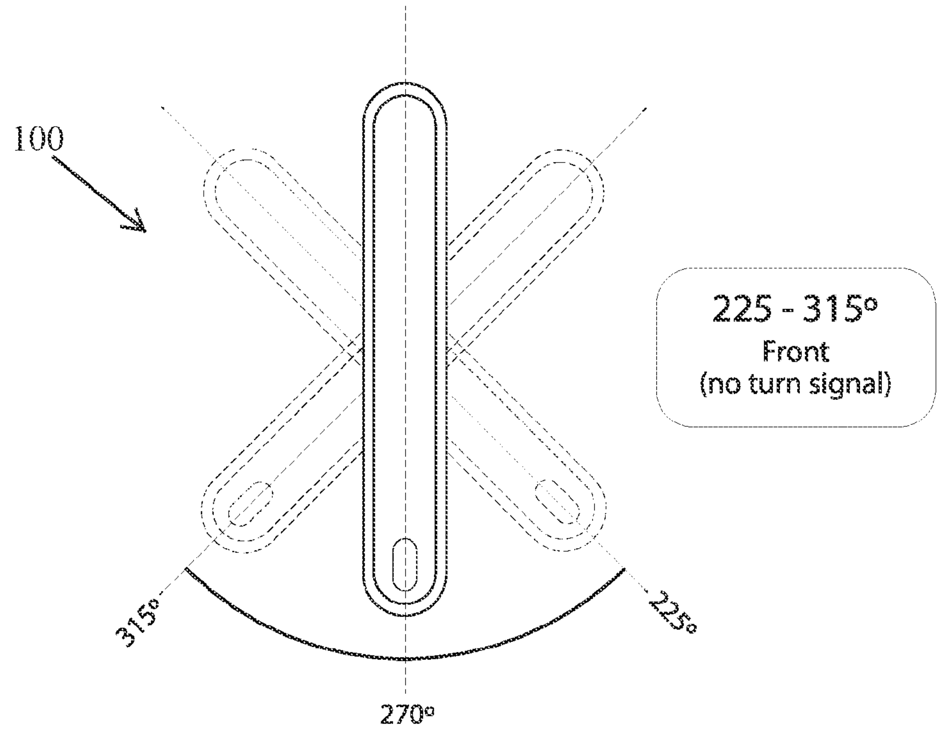
Figure 3D:
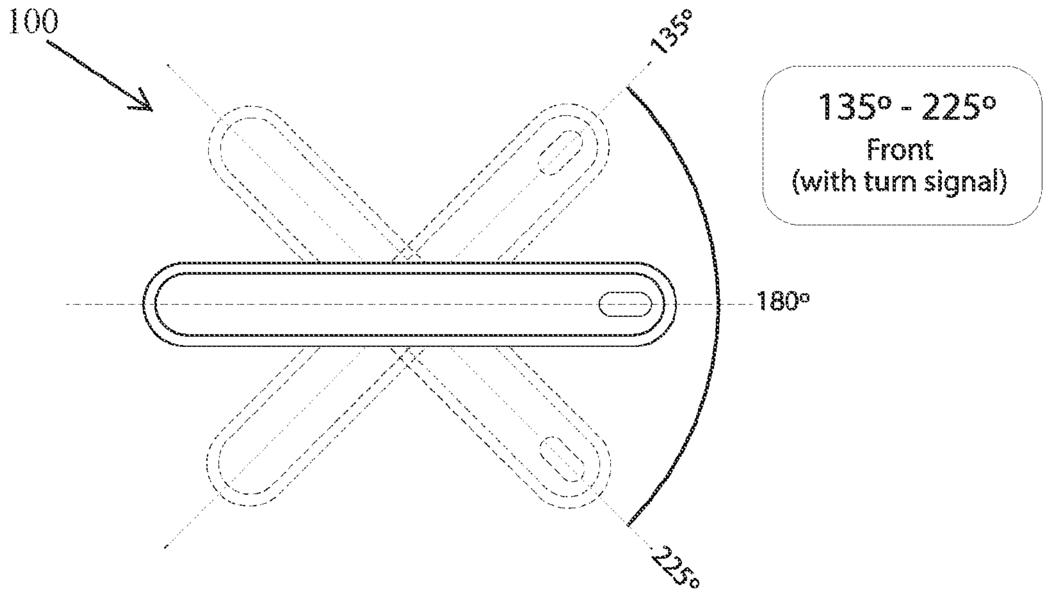

In FIGS. 3C and 3D, a sensor 130 of the smart light 100 determines that the smart light 100 is in a front orientation mode. In FIG. 3C, the smart light 100 and/or light source 120 are at a 270°±45° angle, and can function as a front-facing vertical light (e.g. a headlight operation can be displayed by the smart light 100). In FIG. 3D, the smart light 100 and/or light source 120 are at a 180°±45° angle, and can function as a front-facing horizontal light. Again, the smart light 100 can display turn signals in the horizontal position, and not display turn signals in the vertical position.

Figure 4:
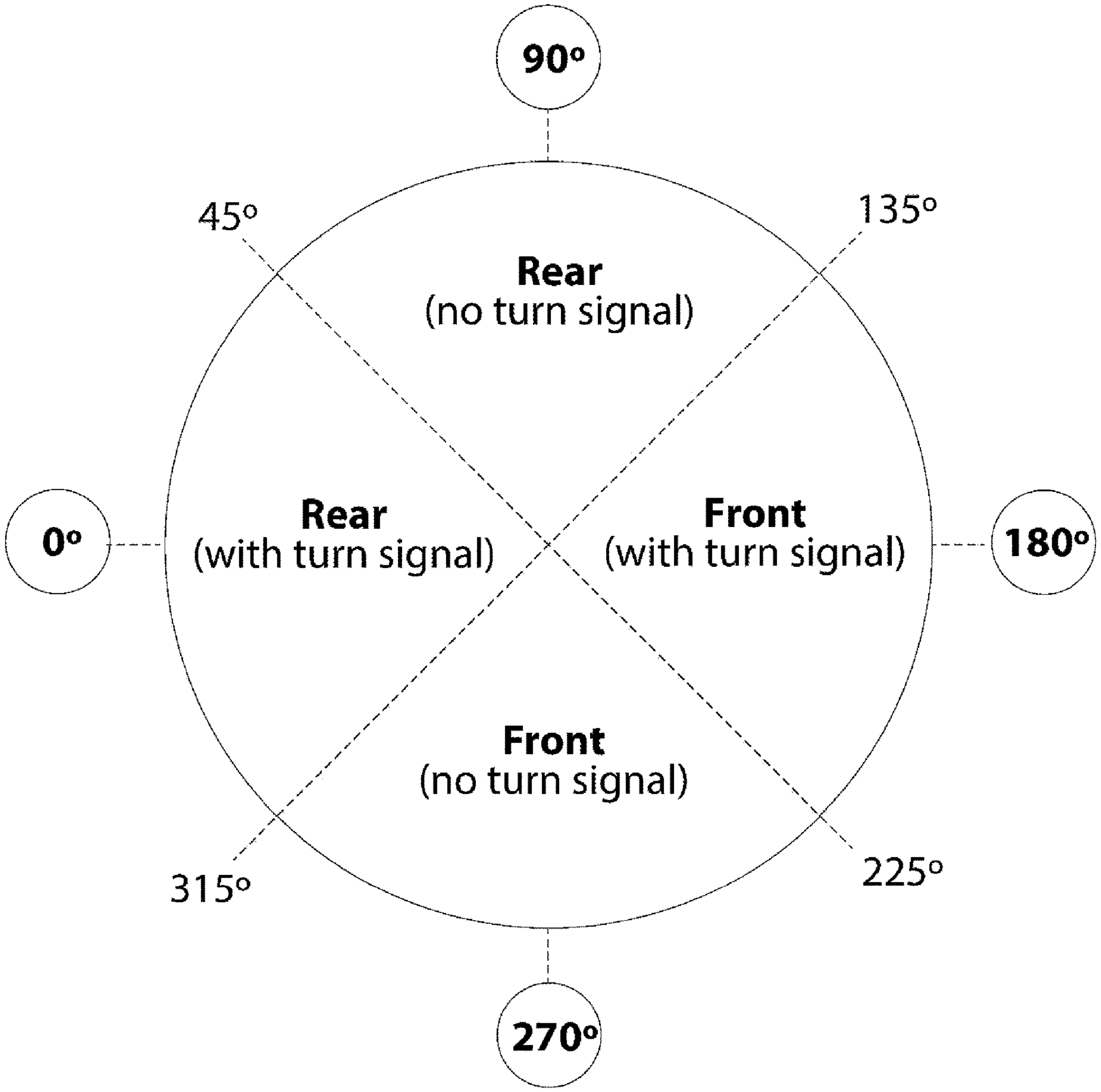
FIG. 4 is a chart illustrating the smart light determining a light emitting mode, as illustrated in FIGS. 3A-3D.

FIG. 4 is a schematic chart illustrating the smart light 100 determining a light emitting mode, as described earlier with reference to FIGS. 3A-3D. For the sake of brevity, the determination of the smart light 100 position, corresponding orientation mode, and light emitting mode will not be repeated.

Figure 5:
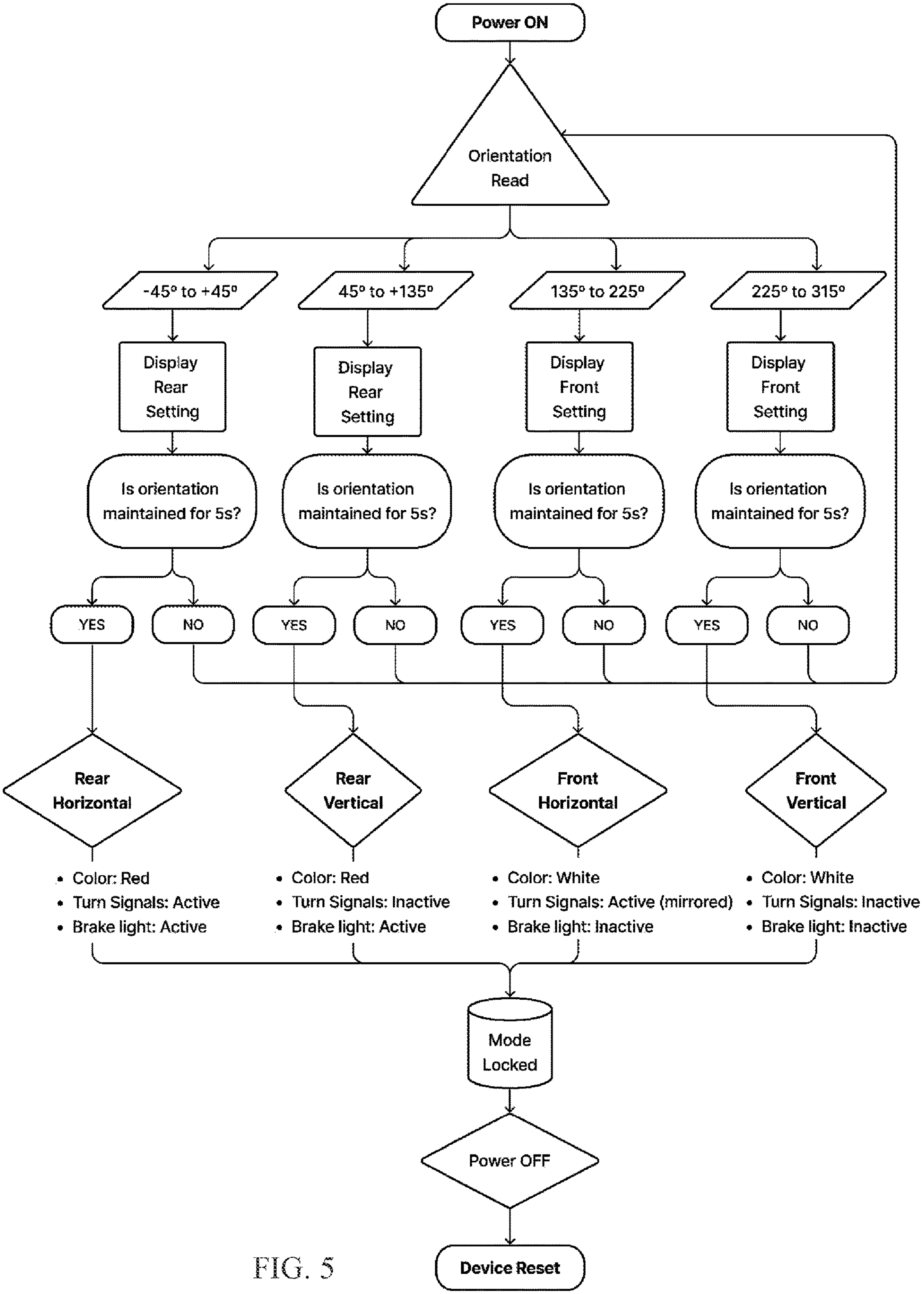
FIG. 5 is a flowchart illustrating an exemplary method of selecting a light emitting mode based upon a determined position of a smart light.

FIG. 5 is a flowchart illustrating an exemplary method of selecting a light emitting mode based upon a determined position of a smart light. First, the smart light can be powered on. A sensor of the smart light can measure the orientation of the smart light, such as an angular position of the light. The sensor can be a gyroscope or any type of sensor that is capable of measuring the orientation of the smart light. Based upon the determined an angular position, either a front or rear setting can be selected and/or displayed. The sensor of the smart light can then determine whether the orientation of the smart light is maintained for a predetermined duration. In one example, the predetermined duration can be 5 seconds. If the orientation is not maintained during the predetermined duration, then the sensor will proceed back to measuring the orientation of the smart light (as described above). On the other hand, if the orientation is maintained during the predetermined duration, then the smart light can enter into a light emitting mode. For example, the light emitting mode can include: a rear horizontal mode, a rear vertical mode, a front horizontal mode, and a front vertical mode. The light emitting mode can be locked until the smart light is powered off and/or the smart light is subject to a device reset.

According to an embodiment of the present disclosure, a rear horizontal mode can include displaying red, and allowing turn signals and brake lights to be displayed. A rear vertical mode can include displaying red, prohibiting turn signals, and allowing brake lights to be displayed. A front horizontal mode can include displaying white, allowing turn signals to be displayed in a mirrored manner relative to the rear horizontal mode, and prohibiting brake lights. A front vertical mode can include displaying white, and prohibiting turn signals and brake lights from being displayed.

Figure 6:
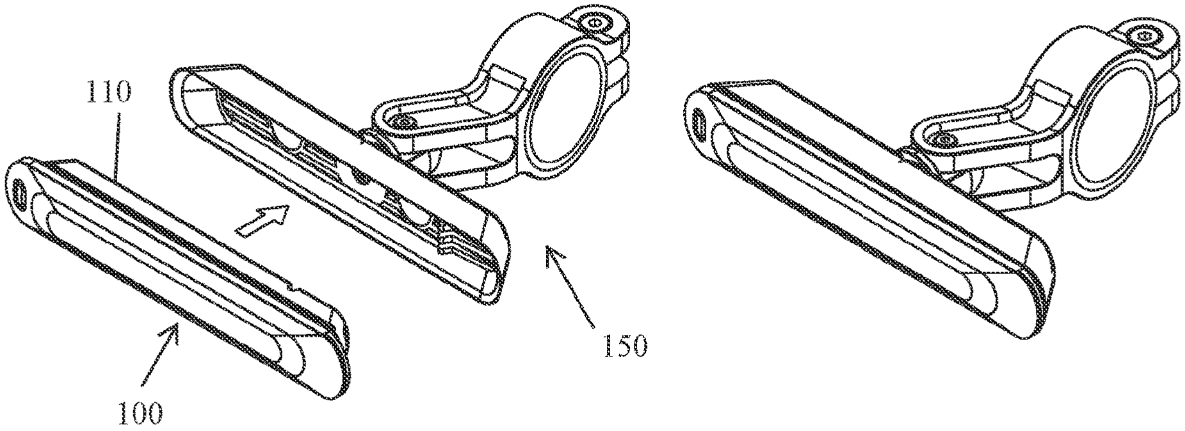
FIG. 6 illustrates an exemplary smart light attaching to an exemplary mount.

As illustrated in FIG. 6, the smart light 100 may be configured to be removably detachable to a mount 150. The mount 150 may be adapted to connect to various types of objects, including to a vehicle (e.g. a bicycle, electric scooter, hover board, skateboard, etc.), user (e.g. via an armband, headband, etc.), vehicle accessory (e.g. helmet, backpack, etc.), or the like. FIGS. 7-11C illustrate specific embodiments of the mount 150 attaching to various objects, including a vertical or horizontal tube of the bicycle frame (e.g., under saddle bar or handlebar), a backpack, and a helmet. Regardless of the particular object, the mount 150 may be universal to connect to a housing 110 of the smart light 100.

Figure 7:
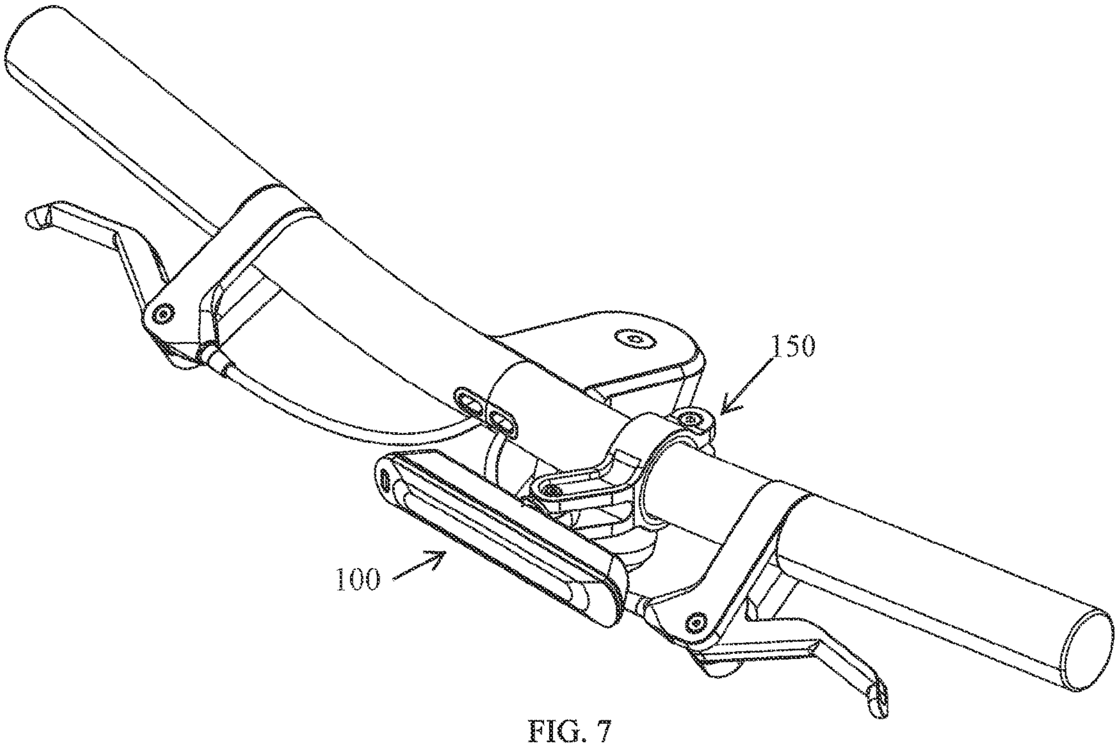
FIG. 7 illustrates an exemplary smart light received by a mount that is connected to a bicycle handlebar.
Figure 8A:
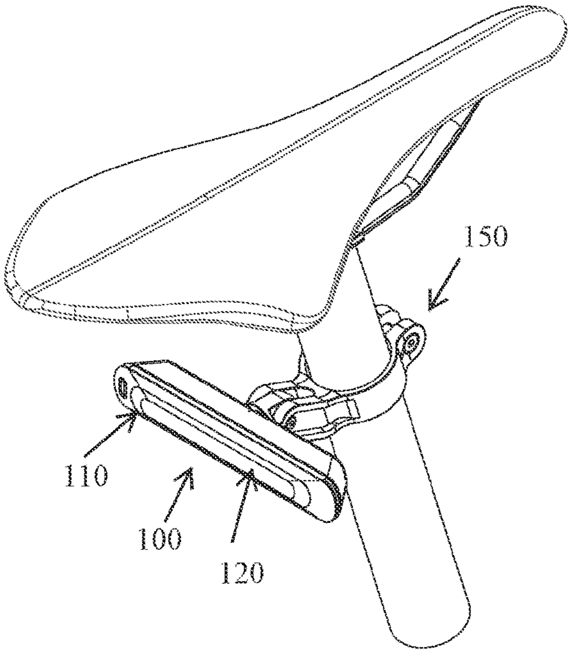
FIG. 8A illustrates an exemplary smart light received by a horizontally oriented mount that is connected to a seatpost of a bicycle.
Figure 8B:
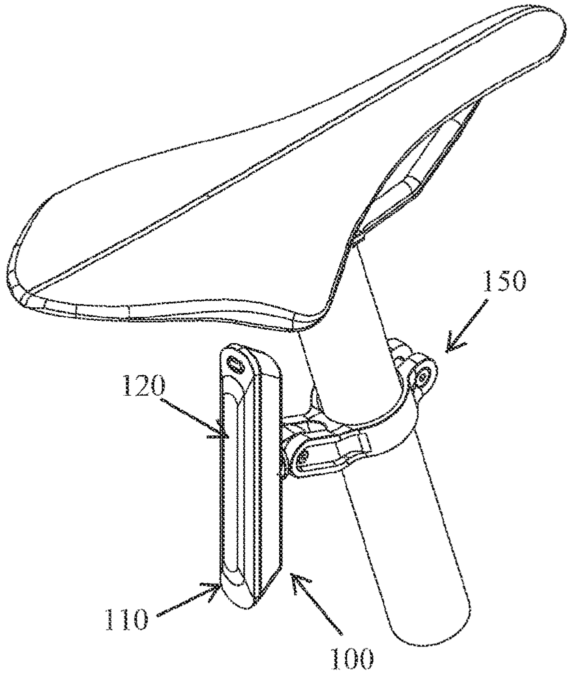
FIG. 8B illustrates an exemplary smart light received by a vertically oriented mount that is connected to a seatpost of a bicycle.

FIG. 7 depicts a smart light 100 located in a mount 150 that is connected to the handlebar of a bicycle. FIGS. 8A and 8B illustrates a smart light 100 located in a mount 150 that is connected under the saddle of a bicycle. The mount 150 can be capable of rotating between a horizontal position, as shown in FIG. 8A, and a vertical position as shown in FIG. 8B. It is also contemplated that the smart light 100 can be rotatable relative to a fixed mount 150 to allow for the same functionality. For example, a light source 120 or portion of the smart light 100 can be rotatable relative to other portions of the smart light 100 or its housing 110. As another example, the mount 150 can be fixed, but have a plurality of mounting positions thereon (e.g. a mount having a vertically oriented cradle, and a horizontally oriented cradle).

Figure 9A:
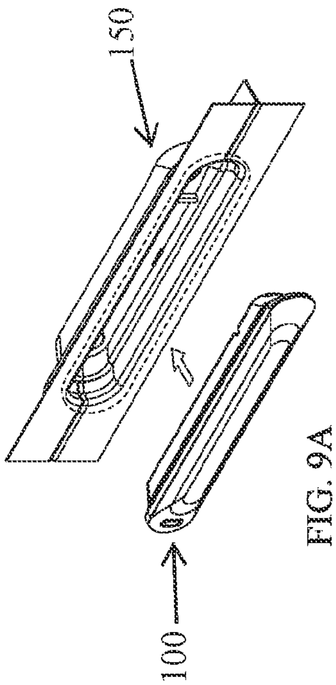
FIGS. 9A-9C illustrates an exemplary smart light received by a mount that can be located on a rear of a backpack.
Figure 9B:
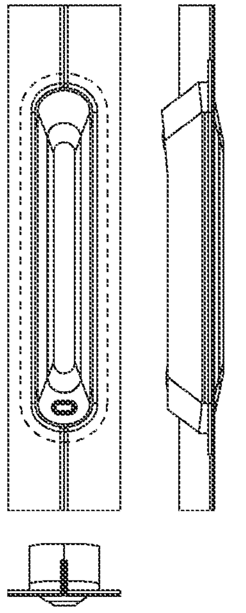
Figure 9C:
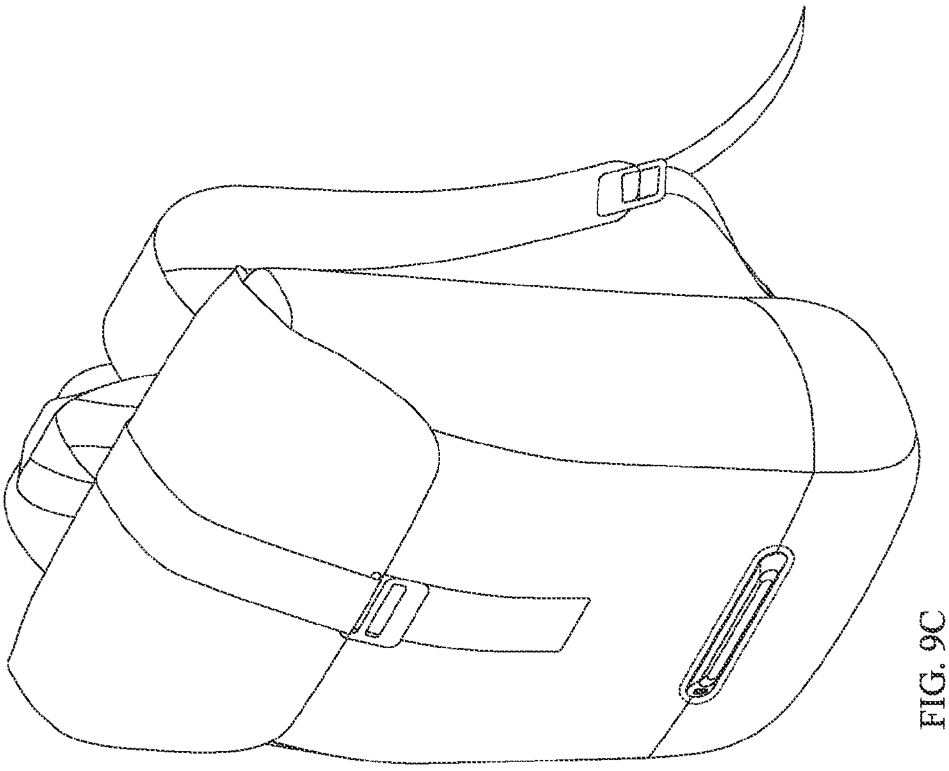

FIGS. 9A-9C illustrate a smart light 100 located in a recessed mount 150 that is located on a rear of a backpack. Specifically, in FIG. 9A, the smart light 100 is urged into a cradle of a mount 150. FIG. 9B illustrates the smart light 100 in a mounted position of the mount 150. FIG. 9C illustrates the mount 150 integrated into (e.g. recessed within) a rear of a backpack, with the smart light 100 in a mounted position.

Figure 10A:
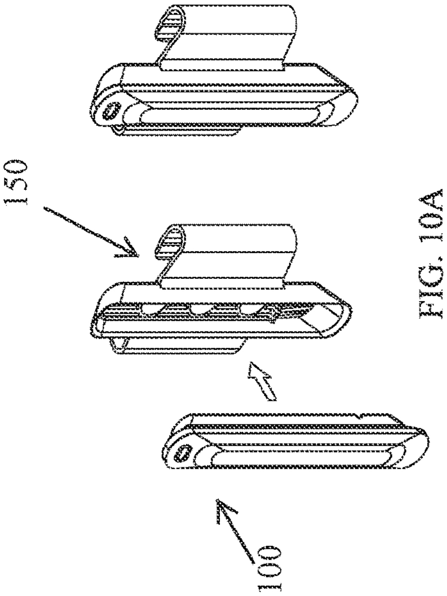
FIGS. 10A-10C illustrates an exemplary smart light received by a mount that can be located on a shoulder strap of a backpack.
Figure 10B:
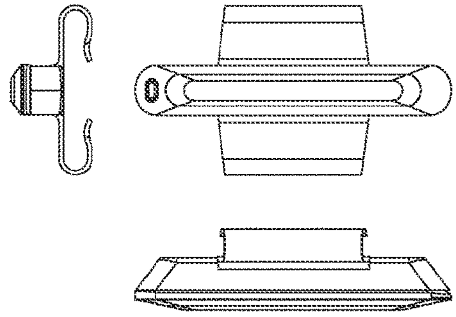
Figure 10C:
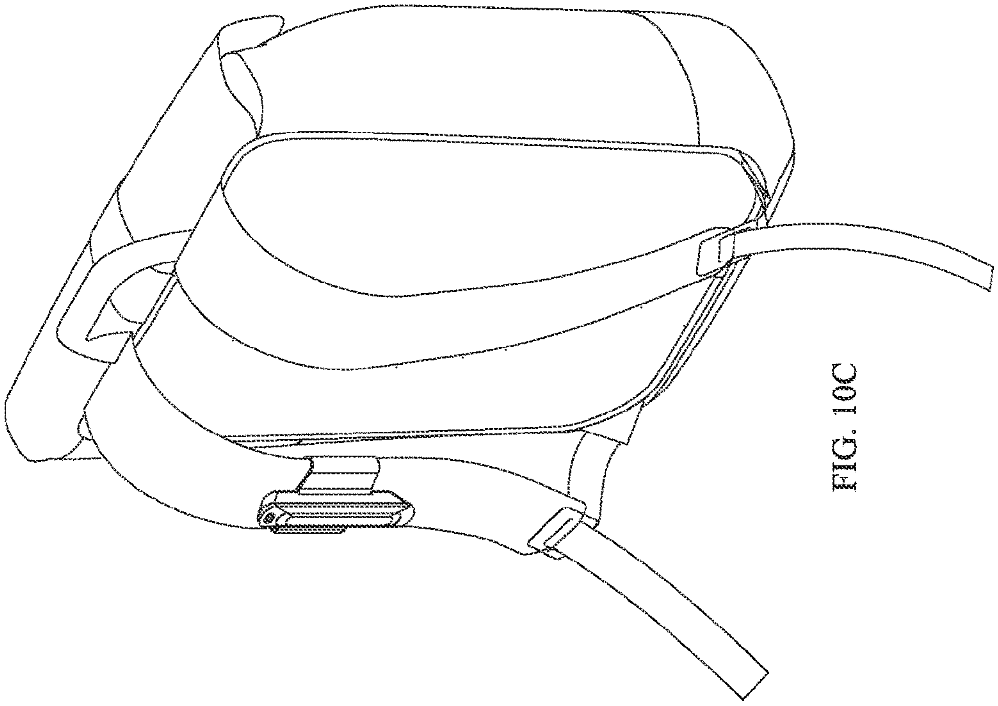

FIGS. 10A-10C illustrate a smart light 100 located in a mount 150 that is located on a front of a backpack. Specifically, in FIG. 10A, the smart light 100 is urged into a cradle of a mount 150. The mount 150 includes clip arms for attaching to an object, such as a shoulder strap of a backpack. FIG. 10B illustrates the smart light 100 in a mounted position of the mount 150. FIG. 10C illustrates the mount 150 located on a front of a backpack, namely on a shoulder strap, with the smart light 100 in a mounted position.

Figure 11A:
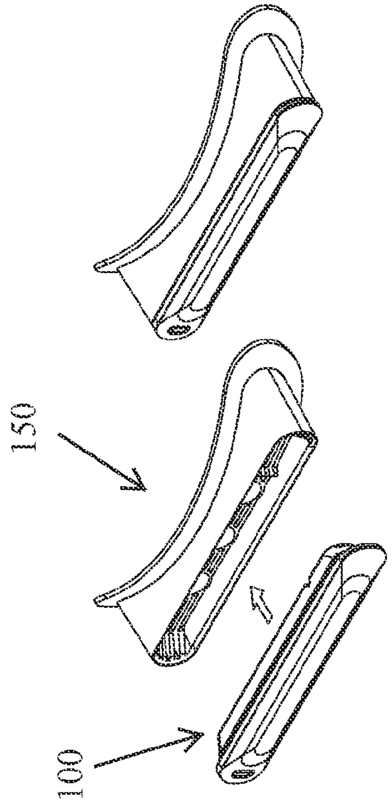
FIGS. 11A-11C illustrates an exemplary smart light received by a mount that can be located on a helmet.
Figure 11B:
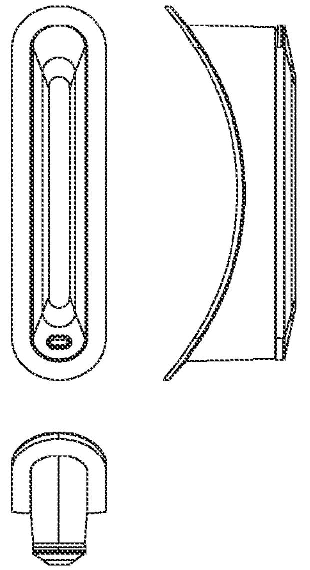
Figure 11C:
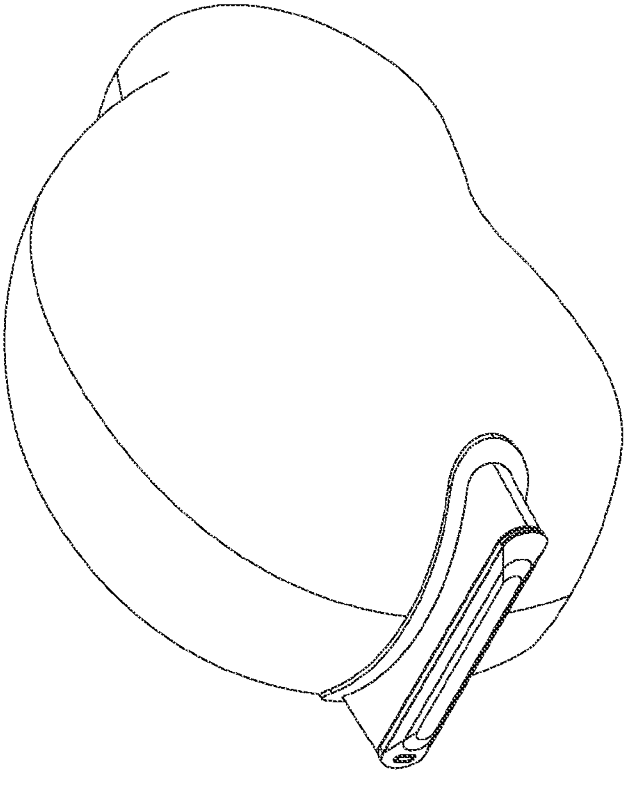

FIGS. 11A-11C illustrate a smart light 100 located in a mount 150 that can be either attached to a helmet, or integrally formed with a helmet. Specifically, in FIG. 10A, the smart light 100 is urged into a cradle of a mount 150. The mount 150 includes a mating edge that can have a complimentary shape (e.g. a curved shape) to a helmet. FIG. 11B illustrates the smart light 100 in a mounted position of the mount 150. FIG. 11C illustrates the mount 150 on a rear of a helmet, with the smart light 100 in a mounted position. Again, the mount 150 can either be attached to a helmet (e.g. via an adhesive or mechanical attachment), or the mount 150 can be integrally formed with the helmet.

Figure 12A:
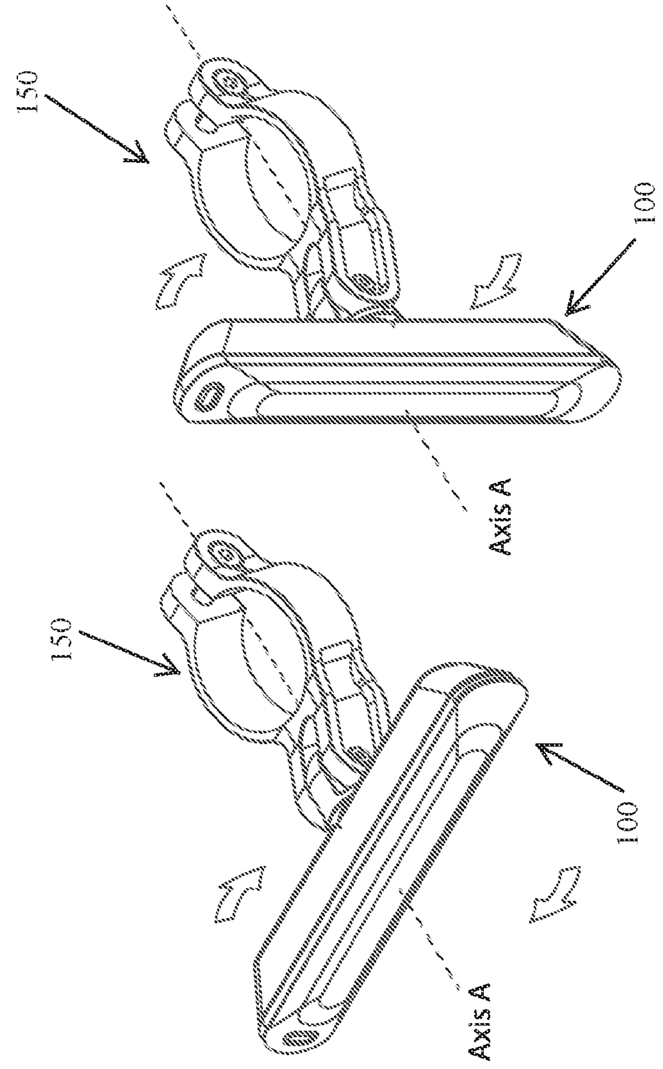
FIG. 12A illustrates an exemplary mount rotating about a first axis.
Figure 12B:
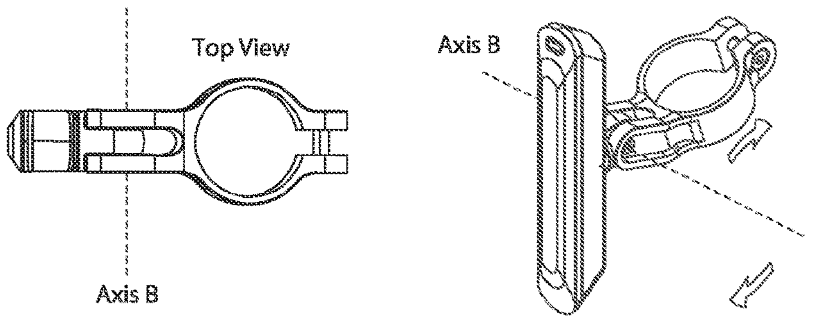
FIG. 12B illustrates an exemplary mount rotating about a second axis.
Figure 12C:
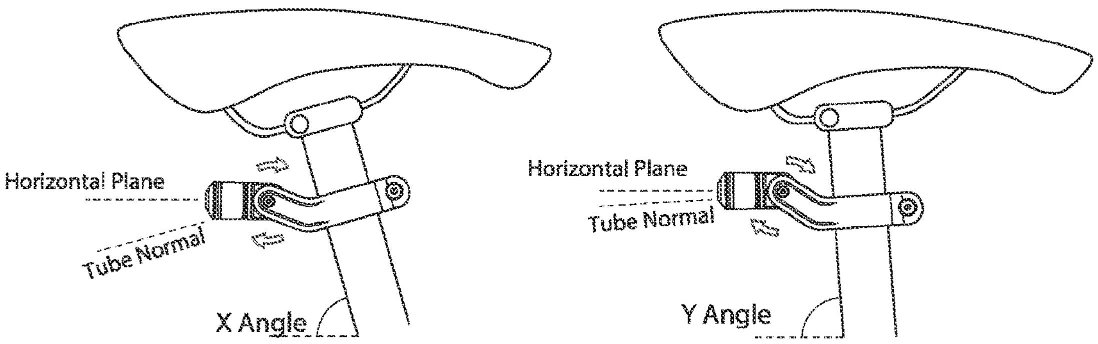
FIG. 12C illustrates an exemplary mount rotating about the second axis on a bicycle seatpost.
Figure 12D:
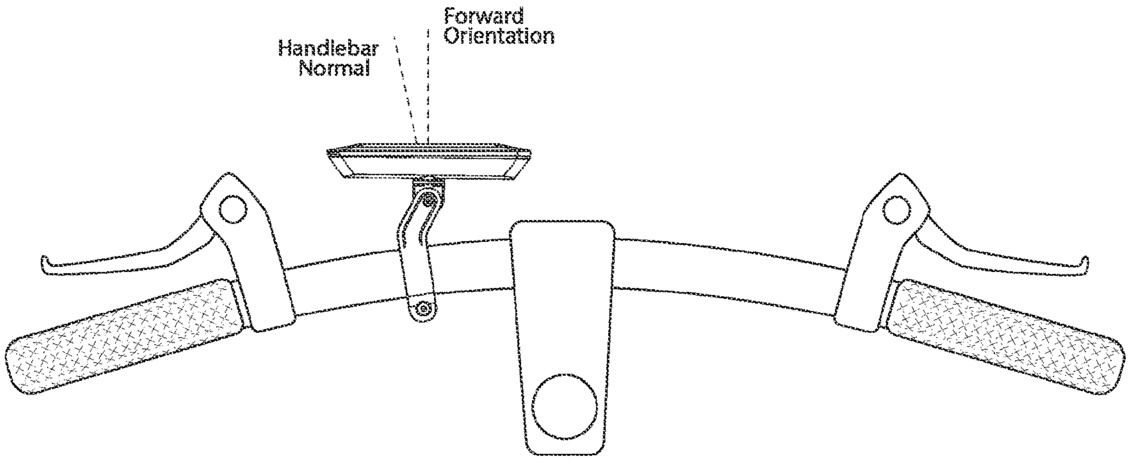
FIG. 12D illustrates an exemplary mount rotating about the second axis on a bicycle handlebar.

According to embodiments of the present disclosure, the mount 150 can be adjustable to accommodate various types of mounting positions. For example, FIGS. 12A-12D illustrate how the mount 150 can allow for rotation about multiples axes so that the smart light 100 may be used for different applications. FIG. 12A, for example, illustrates the mount 150 being rotatable about Axis A so that the smart light 100 can be used in a horizontal orientation (left side) or vertical orientation (right side). FIG. 12B illustrates how a mount 150 can alternatively or additionally be capable of rotating about Axis B. As illustrated in FIG. 12C, rotation about Axis B can allow the smart light 100 to be orientated in an optimal position (e.g. along a horizontal plane) on a seatpost, regardless of the angle that the seatpost may lie. Namely, the seatpost on the left side of 12C lies at an angle X, which is less than the angle of seatpost on the right side of FIG. 12C, which lies at angle Y. As can be seen, the mount 150 is rotated between two positions in FIG. 12C so that the center of the smart light is oriented along the horizontal plane, rather than a normal plane extending from the seatpost tube. FIG. 12D also illustrates how rotation along axis B can allow for optimal alignment of a mount 150 connected to bicycle handlebars. Specifically, the mount 150 can be rotated so that it is oriented along the longitudinal (e.g. direction of travel) of a bicycle, rather than a normal plane extending from a handlebar.

Figure 13A:
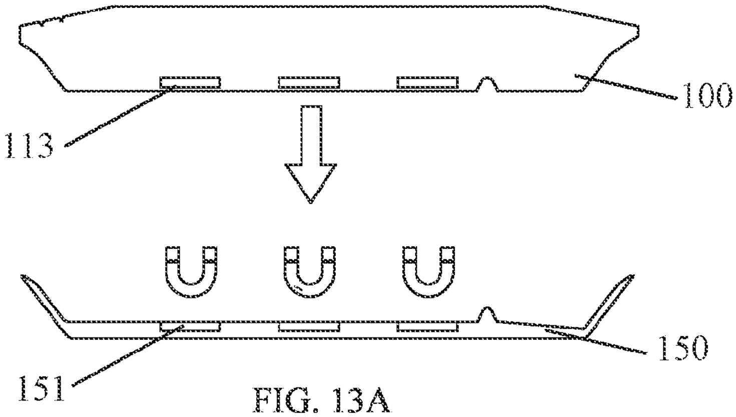
FIGS. 13A-13D illustrate an embodiment of a smart light and mount being removably attachable to one another with magnets.
Figure 13B:
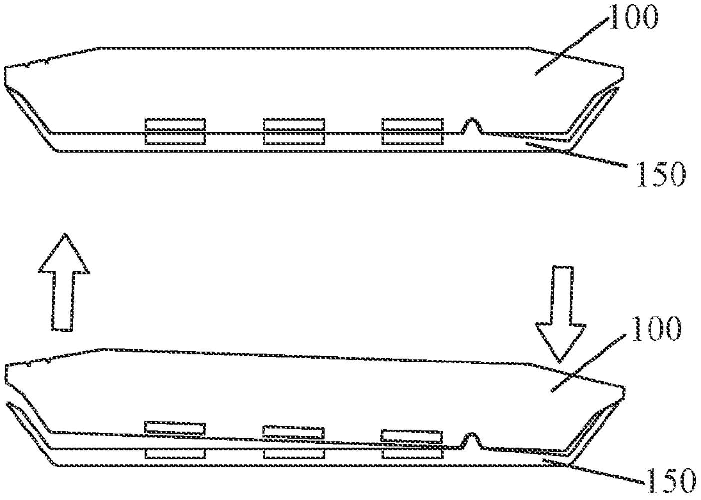
Figure 13C:
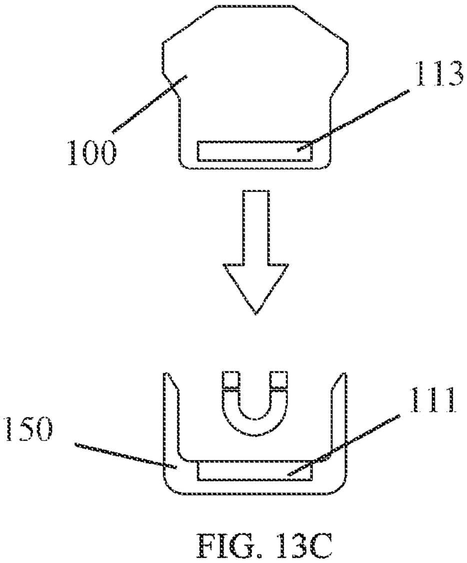
Figure 13D:
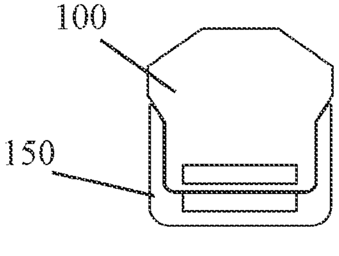

According to embodiments of the present disclosure, a smart light 100 can be removably attachable to a mount 150 by various means. For example, a smart light 100 can be removably attachable to a mount 150 by magnetic force. As illustrated in FIGS. 13A-13D, at least one of the housing 110 of the smart light 100 and the mount 150 can include at least one magnet, and the other of the housing 110 and the mount 150 can include a ferrous metal. Thus, when the housing 110 is connected to the mount 150, the attraction between the magnet 151 and the ferrous metal 111 can retain the smart light 100 within the mount 150. FIG. 13A specifically illustrates an example where the mount 150 includes three magnets 151, and the smart light 100 includes ferrous metal 111 that is magnetically attracted to the magnets upon insertion of the smart light 100 into the mount 150. FIG. 13B illustrates an exemplary process of removing the smart light 100 from the mount 150. In a mounted position (top of FIG. 13B), the cradle of the mount 150 can be shaped such that a gap exists between the cradle and the housing 110 of the smart light 100. Pressing on the smart light 100 above the gap can allow the smart light 100 to be urged downwardly. In this depressed position (bottom of FIG. 13B), the smart light pivots, urging an opposite side of the smart light upwardly, which allows a user to remove the smart light 100 from the mount. FIG. 13C provides a cross-sectional view of the smart light 100 being inserted into the magnetic mount of FIG. 13A. FIG. 13D provides a cross-sectional view of the smart light 100 in a mounted position (e.g. as shown at the top of FIG. 13B).

Figure 14A:
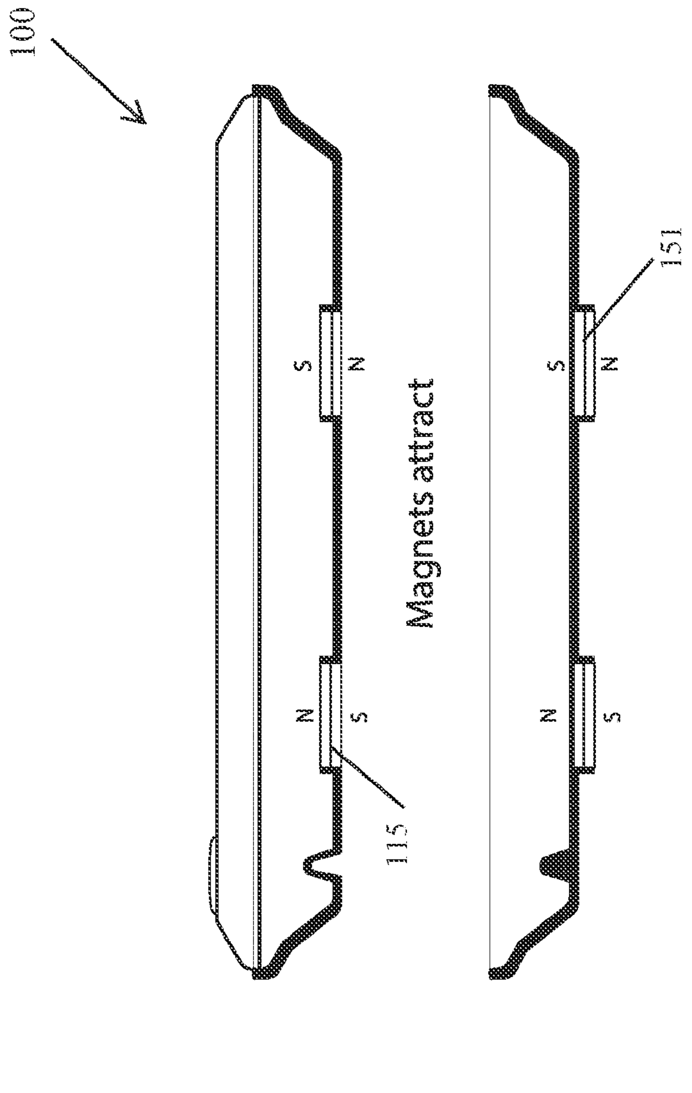
FIGS. 14A-14C illustrate another embodiment of a smart light and mount being removably attachable to one another with magnets.
Figure 14B:
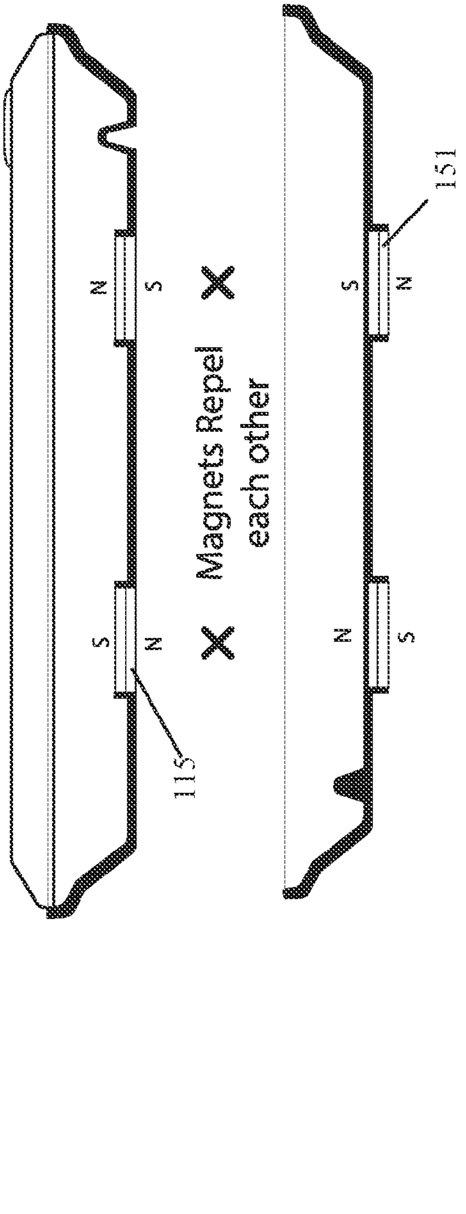
Figure 14C:
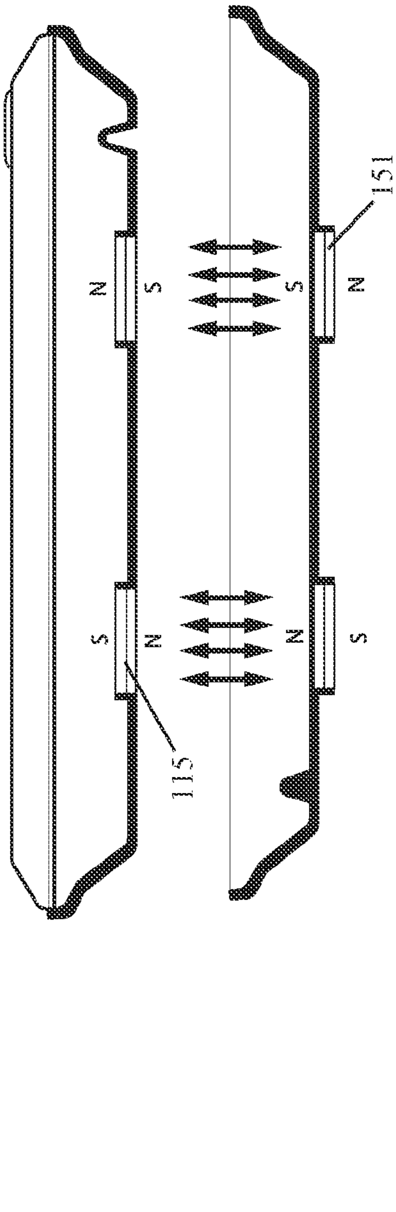

In another example, illustrated in FIG. 14A-14C, both the smart light 100 and the mount 150 can comprise magnets 115, 151. The magnets 115, 151 may have opposite polarity, such that the attraction between the magnets 115, 151 may retain the smart light 100 within the mount 150. Furthermore, each of the smart light 100 and the mount 150 may comprise a pair of magnets 115, 151 having opposite polarity. Thus, the pairs of magnets 115, 151 may attract one another when opposite polarity magnets 115, 151 are aligned (FIG. 14A), but may repel one another when same polarity magnets 115, 151 are aligned FIGS. 14B and 14C). This may cause the housing 110 to be connected to the mount 150 in one orientation, and may prevent the housing 110 from being connected to the mount 150 in the opposite orientation. In this way, proper orientation of the light source 120 can be ensured (e.g. so that the smart light 100 correctly enters a front orientation mode or rear orientation mode, with correct turn signal directions).

Figure 15A:
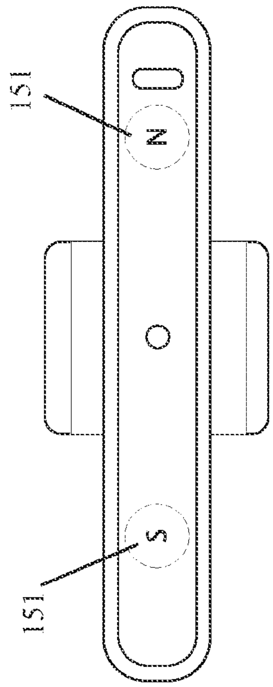
FIGS. 15A-15B illustrate the use of a magnetic arrangement in an exemplary mount.
Figure 15B:
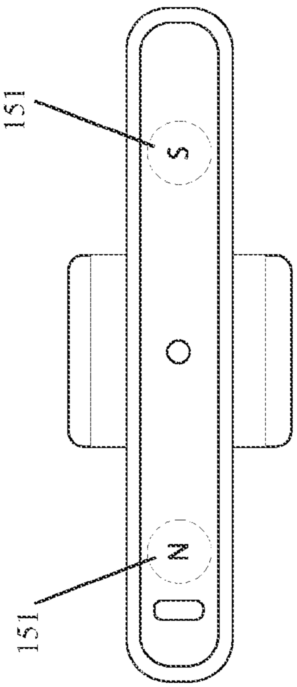

FIGS. 15A and 15B illustrate a mount having magnets 151 with different polarities used for purposes of indicating whether the mount is being used for a front orientation mode or rear orientation mode. Specifically, FIG. 15A shows the mount 150 in a first position, which could be predefined by the smart light system as a front orientation mode. FIG. 15B shows the mount rotating 180° into a second position, which could be used predefined by the smart light system as a rear orientation mode. Since the smart light 100 can only be received by the mount 150 in a way that allows for magnetic attraction, the mount 150, and the smart light 100 can rely on a detected orientation for displaying a correct orientation mode.

Figure 16A:
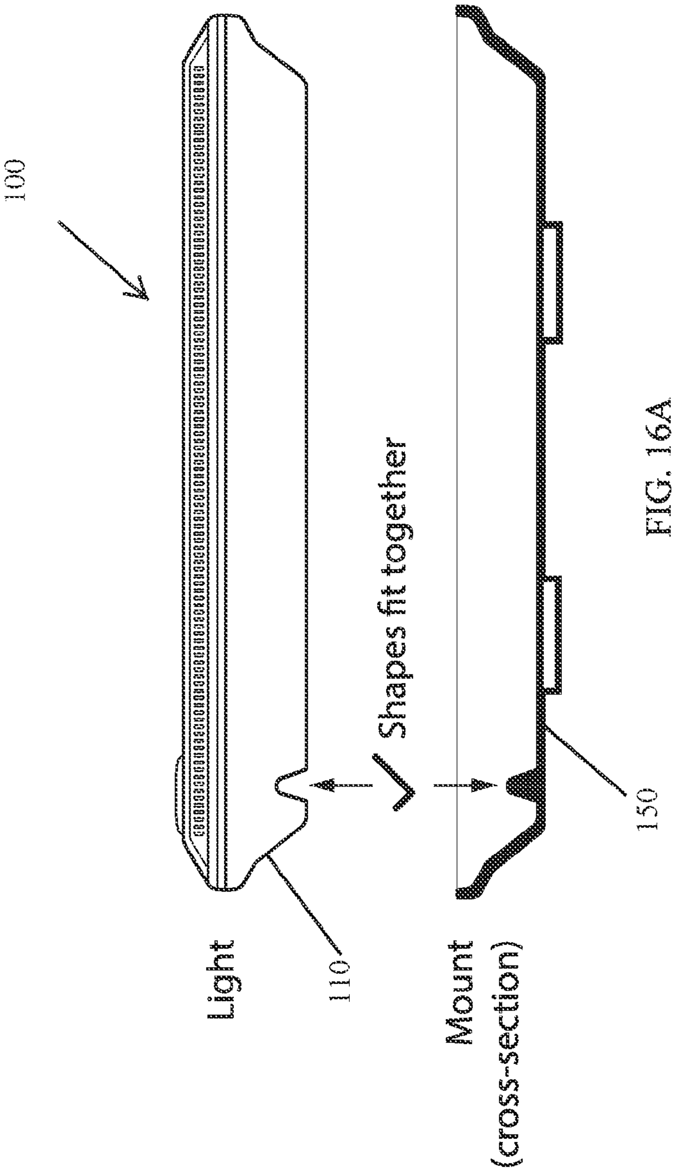
FIGS. 16A-16C illustrate an exemplary mating arrangement of a smart light and mount.
Figure 16B:
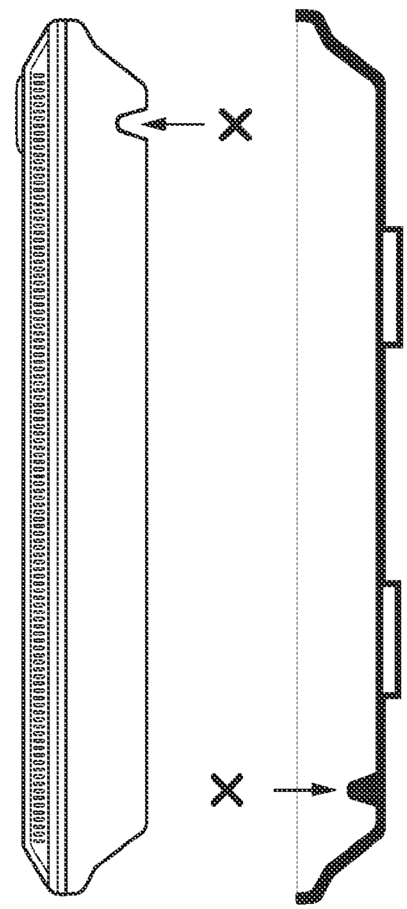
Figure 16C:
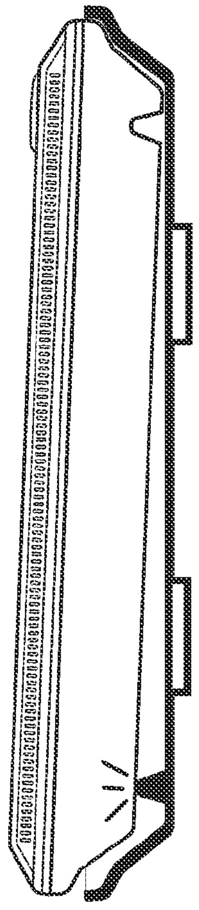

According to embodiments of the present disclosure, the housing 110 of the smart light 100 and the cradle of a mount 150 may be shaped in such a way to ensure proper alignment of the smart light 100 relative to the mount 150. FIGS. 16A-16C illustrate one such example, in which the cradle includes a protrusion and the housing 110 includes a corresponding recess. In this way, the smart light 100 can be fully received by the mount 150 in one orientation, but only partially received by the mount 150 in other orientations. Specifically, FIG. 16B illustrates the smart light 100 being urged toward the mount 150 according to an opposite orientation relative to FIG. 16A. As shown in FIG. 16C, the smart light 100 is blocked from being fully received by the mount due to the recess in the housing 100 being misaligned with the protrusion of the mount.

Figure 17A:
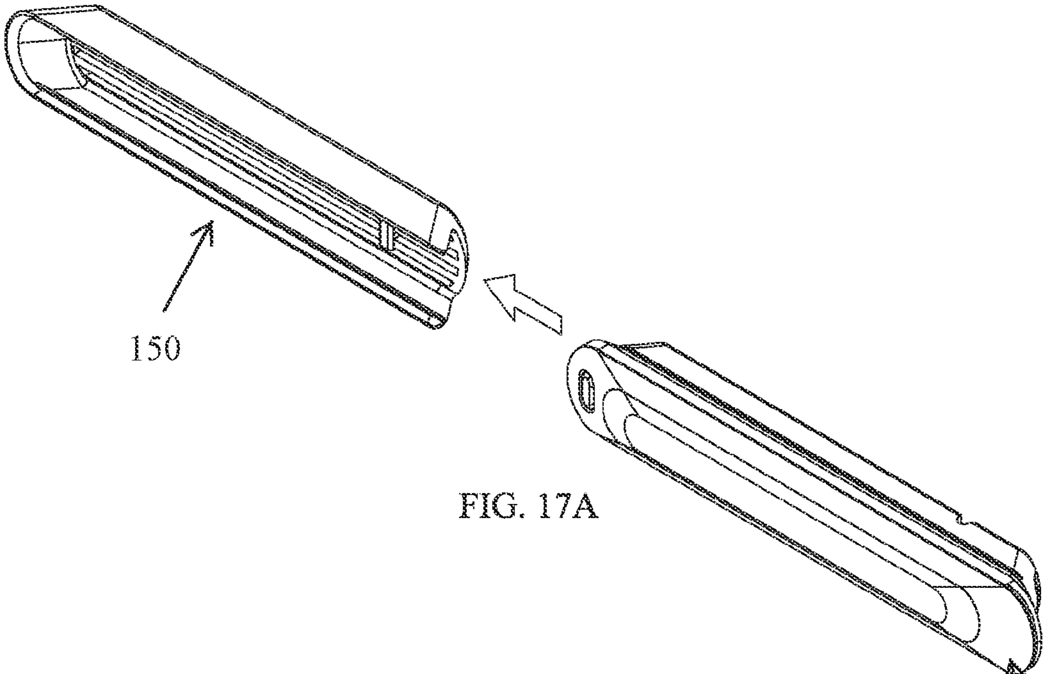
FIGS. 17A-17C illustrate an exemplary mechanical locking arrangement of a smart light and mount.
Figure 17B:
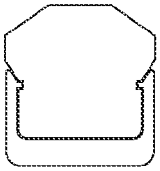
Figure 17C:
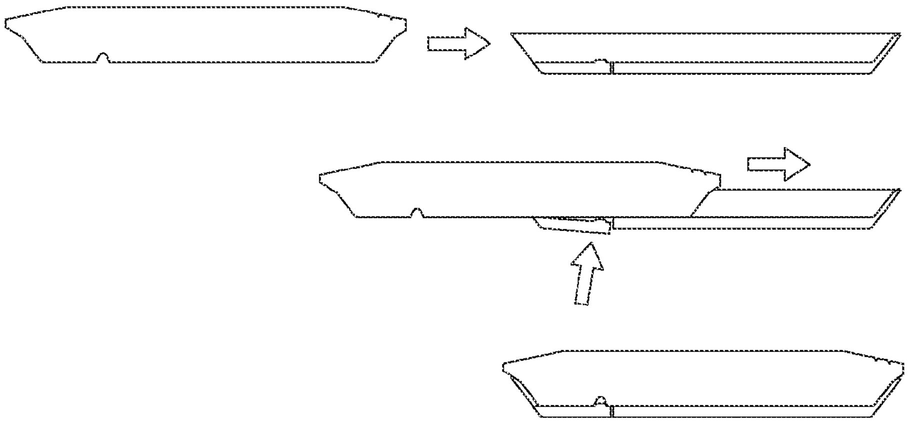

In some embodiments, the housing 110 may be connected to the mount 150 by mechanical means. FIGS. 17A-17C illustrate one example, where the housing 110 includes longitudinal grooves and the mount 150 includes longitudinal protrusions. The longitudinal protrusions may slide within the longitudinal grooves to connect the housing 110 to the mount 150. A rear surface of the housing 110 may further comprise a detent that is configured to receive a flexible snap protrusion of the mount 150. When the flexible snap protrusion is received in the detent, the housing 110 may be retained within the mount 150. The protrusion and detent may also cause the housing 110 to be connected to the mount 150 in one orientation (where the protrusion and detent align), and may prevent the housing 110 from being connected to the mount 150 in the opposite orientation.

Figure 18A:
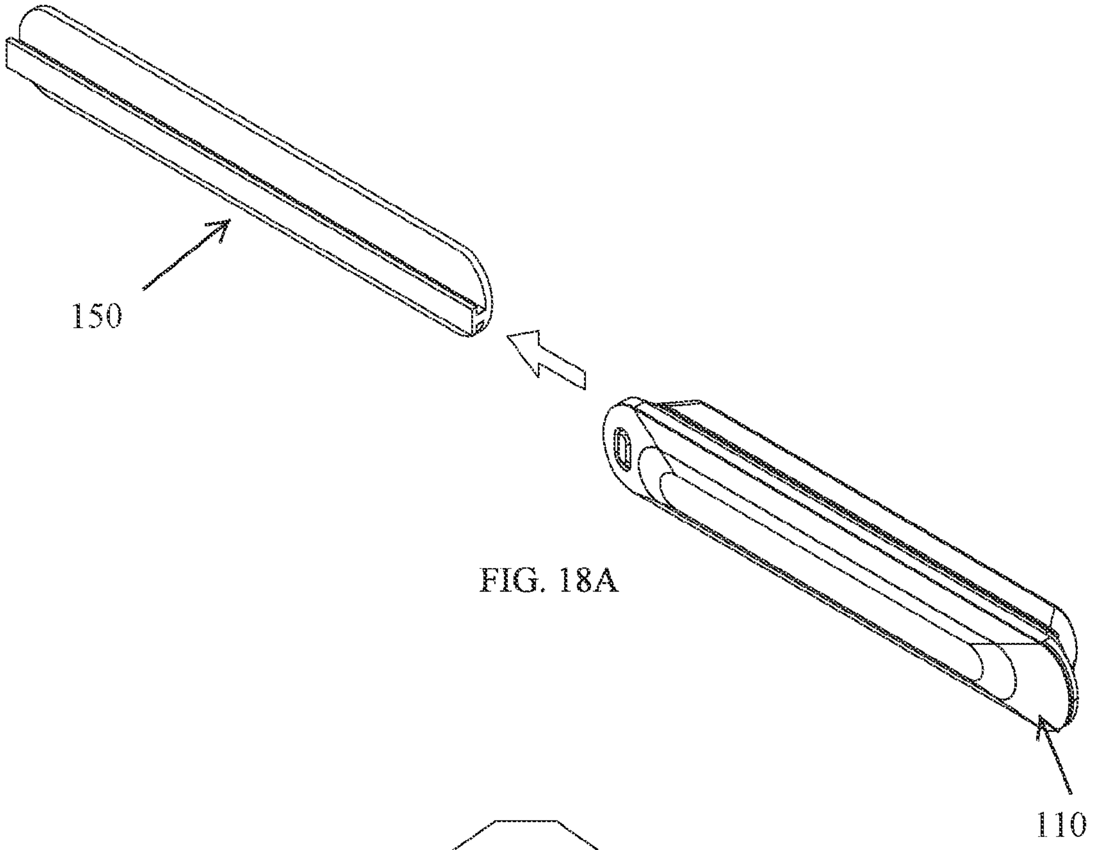
FIGS. 18A-18B illustrate another exemplary mechanical locking arrangement of a smart light and mount.
Figure 18B:
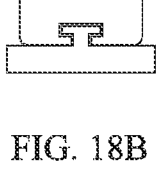
Figure 19A:
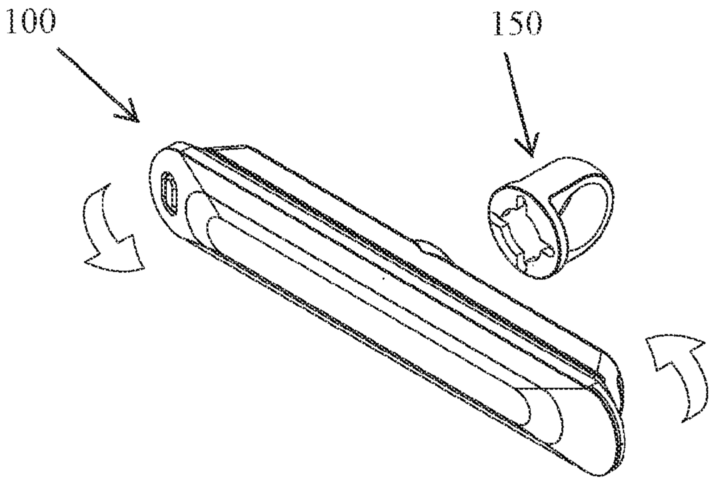
FIGS. 19A-19B illustrate another exemplary mechanical locking arrangement of a smart light and mount.
Figure 19B:
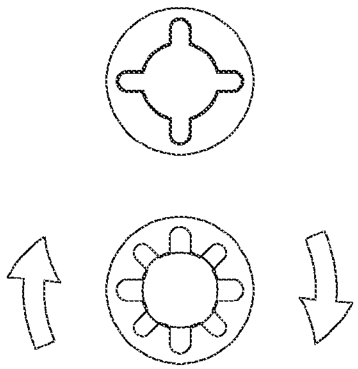

Other mechanical means can be used to connect the housing 110 to the mount 150. FIGS. 18A-18B illustrate an example where the mount 150 includes a rail. A corresponding groove on the rear surface of the housing 110 may be slid along the rail to connect the housing 110 to the mount 150. In another example, depicted in FIG. 19A-19B, the mount 150 and the housing 110 have a rotary locking relationship, which allows the housing 110 to be connected to the mount 150 in one orientation, and by rotating the housing 110 relative to the mount 150, the rotary lock may retain the housing 110 to the mount 150.

In some embodiments, the controller 140 may determine the orientation of the light source 120 after the housing 110 is connected to the mount 150. For example, the sensor 130 may identify when the housing 110 is connected to the mount 150 to send angular position information to the controller 140. The mount 150 itself may also include a sensor, in place of, or in addition to, the sensor 130 within the housing 110. Accordingly, controller 140 may be configured to determine the orientation of the light source 120 based on the angular position information received from either of these sensors 130.

It is also contemplated that the orientation of the smart light can be detected relative to the mount. One or more sensors can be placed on the mount and/or the smart light for determining a relative positional relationship of the smart light and mount. For example, the sensor(s) can be a mechanical switch, a wireless sensor (e.g. RFID, ultrasonic, etc.), a magnetic sensor, an optical or light-based sensor, or other types of sensors that can detect the orientation of the mount relative to the smart light. For instance, one of the mount and/or smart light can have a sensor, and the other of the mount and/or smart light can have a have a corresponding feature that is detectable to discern a positional relationship relative to one another (e.g. left, right, top, and/or bottom). In this way, a positional relationship of the smart light relative to the mount can be determined, for example, without determining a position based upon a gravitational-based measurement.

The smart light 100 of the present disclosure can be used in a variety of ways. For example, the light 100 can be used to provide a constant light source for visibility, or it can be used to display turn and stop signals. The light 100 can also be used to provide a variety of other features, such as a brake light or a headlight. The smart light 100 may have a number of advantages over traditional bicycle lights. For example, the smart light 100 may be easy to mount and dismount, and may be more durable than traditional bicycle lights. The smart light 100 may also be more versatile than traditional bicycle lights, as it can be adapted to perform various functions and/or be mounted to various objects.

In an embodiment of the present disclosure 1000, a modular smart light method can provide safety illumination during a user's operation of a vehicle. The method can include attaching 1010 a modular smart light to a front mount. The modular smart light can be programmed to display a plurality of light operations, including a headlight operation, a taillight operation, a left turn signal operation, and a right turn signal operation. A sensor of the modular smart light can determine 1020 whether the modular smart light is oriented in a front orientation or a rear orientation. The modular smart light can operate 1030 in a front orientation mode based upon the determination of the sensor that the modular smart light is in the front orientation. The modular smart light can switch 1040 from operating in the front orientation mode to operating in a rear orientation mode based upon the determination of the sensor that the modular smart light has moved from the front orientation to a rear orientation. The modular smart light can attach 1050 to a rear mount. The headlight operation can be displayed in the front orientation mode, and the taillight operation can be displayed in the rear orientation mode.

Switching the modular smart light from operating in the front orientation mode to operating the modular smart light in a rear orientation mode can include automatically switching a display side of the left turn signal operation and right turn signal operation based upon the determination of the sensor that the modular smart light has changed from the front orientation mode to the rear orientation mode.

According to another embodiment, a modular smart light system can provide safety illumination during a user's operation of a vehicle. The system can comprise a modular smart light attached to a front mount. The modular smart light can be configured to display a plurality of light operations, including a headlight operation, a taillight operation, a left turn signal operation, and a right turn signal operation. A sensor can be configured to determine whether the modular smart light is oriented in a front orientation or a rear orientation. A processor can be configured to operate the modular smart light in a front orientation mode based upon the determination of the sensor that the modular smart light is in the front orientation. The processor can be configured to switch the modular smart light from operating in the front orientation mode to operating the modular smart light in a rear orientation mode based upon the determination of the sensor that the modular smart light has moved from the front orientation to a rear orientation. The headlight operation can be configured to be displayed in the front orientation mode, and the taillight operation is configured to be displayed in the rear orientation mode.

Figure 20:
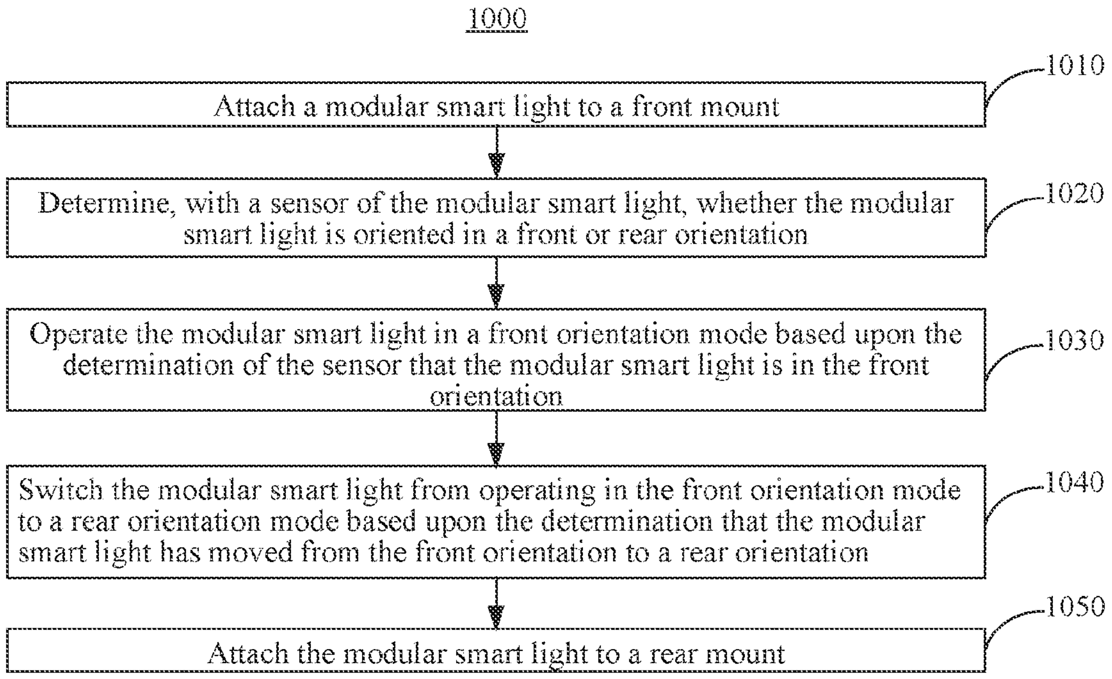
FIG. 20 illustrates an exemplary method of providing safety illumination with a smart light during a user's operation of a vehicle.

According to another embodiment, a non-transitory computer-readable storage medium can have program instructions stored thereon, that when executed by at least one processor, cause the at least one processor to perform the method steps described above, with reference to FIG. 20. For example, the steps can comprise programming a modular smart light to display a plurality of light operations, including a headlight operation, a taillight operation, a left turn signal operation, and a right turn signal operation. A sensor of the modular smart light can determine whether the modular smart light is oriented in a front orientation or a rear orientation. The modular smart light can operate in a front orientation mode based upon the determination of the sensor that the modular smart light is in the front orientation. The modular smart light can switch from operating in the front orientation mode to operating the modular smart light in a rear orientation mode based upon the determination of the sensor that the modular smart light has moved from the front orientation to a rear orientation. The headlight operation can be displayed in the front orientation mode, and the taillight operation can be displayed in the rear orientation mode.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A modular smart light method for providing safety illumination during a user's operation of a vehicle, the method comprising:

attaching a modular smart light to a front mount, the modular smart light programmed to display a plurality of light operations, including a headlight operation, a taillight operation, a left turn signal operation, and a right turn signal operation;

determining, with a sensor of the modular smart light, whether the modular smart light is oriented in a front orientation or a rear orientation;

operating the modular smart light in a front orientation mode based upon the determination of the sensor that the modular smart light is in the front orientation;

switching the modular smart light from operating in the front orientation mode to operating the modular smart light in a rear orientation mode based upon the determination of the sensor that the modular smart light has moved from the front orientation to a rear orientation; and attaching the modular smart light to a rear mount;

wherein the headlight operation is displayed in the front orientation mode, and the taillight operation is displayed in the rear orientation mode;

wherein the sensor is a position sensor configured to measure angular position of the modular smart light.

2. The modular smart light method of claim 1, wherein switching the modular smart light from operating in the front orientation mode to operating the modular smart light in a rear orientation mode includes automatically switching a display side of the left turn signal operation and right turn signal operation based upon the determination of the sensor that the modular smart light has changed from the front orientation mode to the rear orientation mode.

3. The modular smart light method of claim 1, wherein the sensor includes one or more of the following: a gyroscope and an accelerometer.

4. The modular smart light method of claim 1, wherein determining, with the sensor, whether the modular smart light is oriented in the front orientation or the rear orientation comprises detecting a position of the modular smart light relative to the mount.

5. The modular smart light method of claim 4, wherein detecting the position of the modular smart light relative to the mount includes one or more of the following:

detecting a wireless signal from the mount;

detecting a magnetic field from the mount; and detecting a physical shape of the mount.

6. The modular smart light method of claim 1, wherein the front mount is located on one of the following: a front of the vehicle, a front of a helmet, and a front of a backpack;

wherein the rear mount is located on one of the following: a rear of the vehicle, a rear of the helmet, and a rear of the backpack.

7. The modular smart light method of claim 1, wherein the modular smart light is removably detachable to the front mount and to the rear mount via a magnetic attachment system.

8. The modular smart light method of claim 7, wherein the modular smart light can be at least partially received within the front mount and/or the rear mount in a plurality of different relative orientations, including a positive relative orientation and a negative relative orientation;

wherein the magnetic attachment system comprises a plurality of magnets in a pattern of different polar orientations on the front mount and/or the rear mount;

wherein the pattern of different polar orientations are complimentary to a pattern of polar orientations of a plurality magnets on the modular smart light, such that the modular smart light is attracted to the front mount or the rear mount in the positive relative orientation, and the modular smart light is repelled from the front mount or the rear mount in the negative relative orientation.

9. The modular smart light method of claim 1, wherein the modular smart light can be at least partially received within a cradle of the front mount and/or a cradle of the rear mount in a plurality of different relative orientations, including a positive relative orientation and a negative relative orientation; and wherein the cradle of the front mount and/or a cradle of the rear mount are asymmetrically-shaped such that the modular smart light is physically blocked from being fully received by the cradle in the negative relative orientation, and fully received by the cradle in the positive relative orientation.

10. The modular smart light method of claim 1, wherein determining, with the sensor of the modular smart light, whether the modular smart light is oriented in the front orientation or the rear orientation is performed prior to the attaching the modular smart light to the front mount.

11. The modular smart light method of claim 1, wherein the vehicle includes: a bicycle, an electric scooters, a hover board, and a skateboard.

12. The modular smart light method of claim 1, wherein determining, with the sensor of the modular smart light, whether the modular smart light is oriented in a front orientation or a rear orientation comprises:

determining, with the sensor of the modular smart light, an angular orientation of the modular smart light;

wherein switching the modular smart light from operating in the front orientation mode to operating the modular smart light in a rear orientation mode based upon the determination of the sensor that the modular smart light has moved from the front orientation to a rear orientation comprises:

determining that the angular orientation of the modular smart light has changed more than an angular threshold during a predetermined period of time.

13. The modular smart light method of claim 12, wherein the angular threshold is greater than or equal to 45° angular threshold and the predetermined period of time is greater than or equal to ten seconds.

14. The modular smart light method of claim 1, wherein the modular smart light comprises an array of light-emitting diodes configured to display red, green, and blue light.

15. The modular smart light method of claim 1, further comprising adjusting at least one visual parameter of the plurality of light operations of the modular smart light via wireless communication with a first electronic device; and controlling the modular smart light to display the left turn signal operation, and to display a right turn signal operation with a second electronic device.

16. The modular smart light method of claim 1, wherein determining, with the sensor of the modular smart light, whether the modular smart light is oriented in the front orientation or the rear orientation is based upon a rotational position of the modular smart light;

wherein switching the modular smart light from operating in the front orientation mode to operating the modular smart light in a rear orientation mode includes automatically switching a display side of the left turn signal operation and right turn signal operation based upon the determination of the sensor that the modular smart light has rotated from the front orientation mode to the rear orientation mode;

wherein the modular smart light is removably detachable to the front mount and to the rear mount via a magnetic attachment system;

wherein the modular smart light can be at least partially received within the front mount and/or the rear mount in a plurality of different relative orientations, including a positive relative orientation and a negative relative orientation;

wherein the magnetic attachment system comprises a plurality of magnets in a pattern of different polar orientations on the front mount and/or the rear mount;

wherein the pattern of different polar orientations are complimentary to a pattern of polar orientations of a plurality magnets on the modular smart light, such that the modular smart light is attracted to the front mount or the rear mount in the positive relative orientation, and the modular smart light is repelled from the front mount or the rear mount in the negative relative orientation.

17. A modular smart light system for providing safety illumination during a user's operation of a vehicle, the system comprising:

a modular smart light attached to a front mount, the modular smart light configured to display a plurality of light operations, including a headlight operation, a taillight operation, a left turn signal operation, and a right turn signal operation;

a sensor configured to determine whether the modular smart light is oriented in a front orientation or a rear orientation; and a processor configured to operate the modular smart light in a front orientation mode based upon the determination of the sensor that the modular smart light is in the front orientation;

wherein the processor is configured to switch the modular smart light from operating in the front orientation mode to operating the modular smart light in a rear orientation mode based upon the determination of the sensor that the modular smart light has moved from the front orientation to a rear orientation;

wherein the headlight operation is configured to be displayed in the front orientation mode, and the taillight operation is configured to be displayed in the rear orientation mode;

wherein the sensor is a position sensor configured to measure angular position of the modular smart light.

18. The modular smart light system of claim 17, wherein switching the modular smart light from operating in the front orientation mode to operating the modular smart light in a rear orientation mode includes automatically switching left and right sides of the left turn signal operation and right turn signal operation based upon the determination of the sensor that the modular smart light has changed from the front orientation mode to the rear orientation mode.

19. A non-transitory computer-readable storage medium having program instructions stored thereon, that when executed by at least one processor, cause the at least one processor to perform steps comprising:

programming a modular smart light to display a plurality of light operations, including a headlight operation, a taillight operation, a left turn signal operation, and a right turn signal operation;

determining, with a sensor of the modular smart light, whether the modular smart light is oriented in a front orientation or a rear orientation;

operating the modular smart light in a front orientation mode based upon the determination of the sensor that the modular smart light is in the front orientation; and switching the modular smart light from operating in the front orientation mode to operating the modular smart light in a rear orientation mode based upon the determination of the sensor that the modular smart light has moved from the front orientation to a rear orientation;

wherein the headlight operation is displayed in the front orientation mode, and the taillight operation is displayed in the rear orientation mode;

wherein the sensor is a position sensor configured to measure angular position of the modular smart light.

20. The non-transitory computer-readable storage medium of claim 19, wherein switching the modular smart light from operating in the front orientation mode to operating the modular smart light in a rear orientation mode includes automatically switching left and right sides of the left turn signal operation and right turn signal operation based upon the determination of the sensor that the modular smart light has changed from the front orientation mode to the rear orientation mode.

* * * * *